(12) United States Patent
Merlin et al.

(10) Patent No.: US 10,111,132 B2
(45) Date of Patent: Oct. 23, 2018

(54) METHODS AND APPARATUS FOR CHANNEL STATE INFORMATION SOUNDING AND FEEDBACK

(71) Applicant: QUALCOMM Incorporated, San Diego, CA (US)

(72) Inventors: Simone Merlin, San Diego, CA (US); Youhan Kim, San Jose, CA (US); Bin Tian, San Diego, CA (US); George Cherian, San Diego, CA (US); Alfred Asterjadhi, San Diego, CA (US); Sameer Vermani, San Diego, CA (US); Gwendolyn Denise Barriac, Encinitas, CA (US)

(*) Notice: Subject to any disclaimer, the term of this patent is extended or adjusted under 35 U.S.C. 154(b) by 85 days.

(21) Appl. No.: 15/052,827

(22) Filed: Feb. 24, 2016

(65) Prior Publication Data

US 2016/0262051 A1 Sep. 8, 2016

Related U.S. Application Data

(60) Provisional application No. 62/127,187, filed on Mar. 2, 2015, provisional application No. 62/235,564, filed on Sep. 30, 2015.

(51) Int. Cl.
*H04W 4/00* (2018.01)
*H04W 28/06* (2009.01)
(Continued)

(52) U.S. Cl.
CPC ......... *H04W 28/06* (2013.01); *H04B 7/0626* (2013.01); *H04B 7/0643* (2013.01);
(Continued)

(58) Field of Classification Search
None
See application file for complete search history.

(56) References Cited

U.S. PATENT DOCUMENTS 8,422,428 B1 * 4/2013 Hilyard ............... H04L 41/0654
370/328
2007/0298742 A1  12/2007 Ketchum et al.
(Continued)

FOREIGN PATENT DOCUMENTS

EP        2988564 A1      2/2016
WO  WO-2012044863 A1     4/2012
WO  WO-2014169694 A1    10/2014

OTHER PUBLICATIONS

International Search Report and Written Opinion—PCT/US2016/019715—ISA/EPO—dated Jun. 9, 2016.

*Primary Examiner* — Anh-Vu Ly
(74) *Attorney, Agent, or Firm* — Knobbe, Martens, Olson & Bear LLP

(57) ABSTRACT

Methods and apparatus for channel state information feedback are provided. In various aspects, a message is transmitted requesting channel feedback information. In some aspects, a first portion of the message is transmitted according to a first or second, and contains first information intended for a first or second set of wireless communication devices compatible with the first or second format respectively. In some aspects, a second portion of the first message is transmitted according to the second format, and contains second information intended for the second set of wireless communication devices compatible with the second format. In some aspects, the second message comprises a number of tones or spatial streams for which channel feedback information is requested, or other channel feedback information parameters.

26 Claims, 14 Drawing Sheets

(51) Int. Cl.
  *H04L 5/00*    (2006.01)
  *H04W 72/04*   (2009.01)
  *H04L 1/00*    (2006.01)
  *H04B 7/06*    (2006.01)
  *H04B 7/0452*  (2017.01)

(52) U.S. Cl.
  CPC .......... *H04L 1/0026* (2013.01); *H04L 1/0027* (2013.01); *H04L 5/0057* (2013.01); *H04W 72/0413* (2013.01); *H04B 7/0452* (2013.01)

(56) References Cited

U.S. PATENT DOCUMENTS

| | | |
|---|---|---|
| 2010/0248635 A1 | 9/2010 | Zhang et al. |
| 2011/0128929 A1* | 6/2011 | Liu .................. H04L 25/03343 370/329 |
| 2012/0140753 A1 | 6/2012 | Lee et al. |
| 2012/0250543 A1* | 10/2012 | Abraham ............ H04B 7/0626 370/252 |
| 2013/0188630 A1 | 7/2013 | Song et al. |
| 2014/0301240 A1 | 10/2014 | Park et al. |
| 2014/0369302 A1 | 12/2014 | Abraham et al. |
| 2015/0110046 A1 | 4/2015 | Merlin et al. |
| 2015/0296454 A1 | 10/2015 | Lee et al. |
| 2016/0143026 A1* | 5/2016 | Seok ................ H04W 72/0413 370/329 |
| 2016/0261327 A1 | 9/2016 | Merlin et al. |
| 2016/0262050 A1 | 9/2016 | Merlin et al. |
| 2017/0338927 A1* | 11/2017 | Park ..................... H04L 5/0051 370/329 |
| 2017/0367118 A1* | 12/2017 | Choi ................ H04W 74/0816 370/329 |

\* cited by examiner

METHODS AND APPARATUS FOR CHANNEL STATE INFORMATION SOUNDING AND FEEDBACK

CROSS REFERENCE TO PRIORITY APPLICATIONS

This application claims priority under 35 U.S.C. § 119(e) to U.S. Provisional Pat. App. 62/127,187 entitled "METHODS AND APPARATUS FOR CHANNEL STATE INFORMATION SOUNDING AND FEEDBACK" filed on Mar. 2, 2015 and to U.S. Provisional Pat. App. 62/235,564 entitled "METHODS AND APPARATUS FOR CHANNEL STATE INFORMATION SOUNDING AND FEEDBACK" filed on Sep. 30, 2015, the disclosures of which are hereby incorporated by reference in their entireties.

BACKGROUND

Field

Certain aspects of the present disclosure generally relate to wireless communications, and more particularly, to methods and apparatus for channel state information sounding and feedback.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send channel state information feedback to the access point, it is desirable to minimize the amount of traffic to complete the uplink of the channel state information. Thus, there is a need for an improved protocol for uplink of channel state information from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises transmitting a first portion of a first message according to a first format or a second format. The first portion of the first message may contain first information intended for a first set of wireless communication devices compatible with the first format or a second set of wireless communication devices compatible with the second format, and the first message may request channel state information. The method further comprises transmitting a second portion of the first message according to the second format. The second portion of the first message may contain second information intended for the second set of wireless communication devices compatible with the second format. The second portion of the message may comprise an indication of a number of tones or spatial streams for which the channel feedback information is requested.

Another aspect of the disclosure provides an apparatus for wireless communication. The apparatus comprising a processor configured to generate a first portion of a first message according to a first format or a second format. The first portion of the first message may contain first information intended for a first set of wireless communication devices compatible with the first format or a second set of wireless communication devices compatible with the second format, and the first message may request channel state information. The processor of the apparatus may be further configured to generate a second portion of the first message according to the second format, the second portion of the first message containing second information intended for the second set of wireless communication devices compatible with the second format, the second portion of the first message comprising an indication of a number of tones or spatial streams for which the channel feedback information is requested. The apparatus may further comprise a transmitter configured to transmit the first message.

Another aspect of the disclosure provides an apparatus for wireless communication. The apparatus comprising means for generating a first portion of a first message according to a first format or a second format. The first portion of the first message may contain first information intended for a first set of wireless communication devices compatible with the first format or a second set of wireless communication devices compatible with the second format, and the first message may request channel state information. The apparatus may further comprise means for generating a second portion of the first message according to the second format, the second portion of the first message containing second information intended for the second set of wireless communication devices compatible with the second format, the second portion of the first message comprising an indication of a number of tones or spatial streams for which the channel feedback information is requested. The apparatus may further comprise a means for transmitting the first message.

Another aspect of the disclosure provides a non-transitory computer readable medium. The medium comprises instructions stored thereon that, when executed cause a processor of an apparatus to perform a method of wireless communication. The method of wireless communication comprises transmitting a first portion of a first message according to a first format or a second format. The first portion of the first message may contain first information intended for a first set of wireless communication devices compatible with the first format or a second set of wireless communication devices compatible with the second format, and the first message may request channel state information. The method further comprises transmitting a second portion of the first message according to the second format. The second portion of the first message may contain second information intended for the second set of wireless communication devices compatible with the second format. The second portion of the message may comprise an indication of a number of tones or spatial streams for which the channel feedback information is requested.

DETAILED DESCRIPTION

Figure 1:
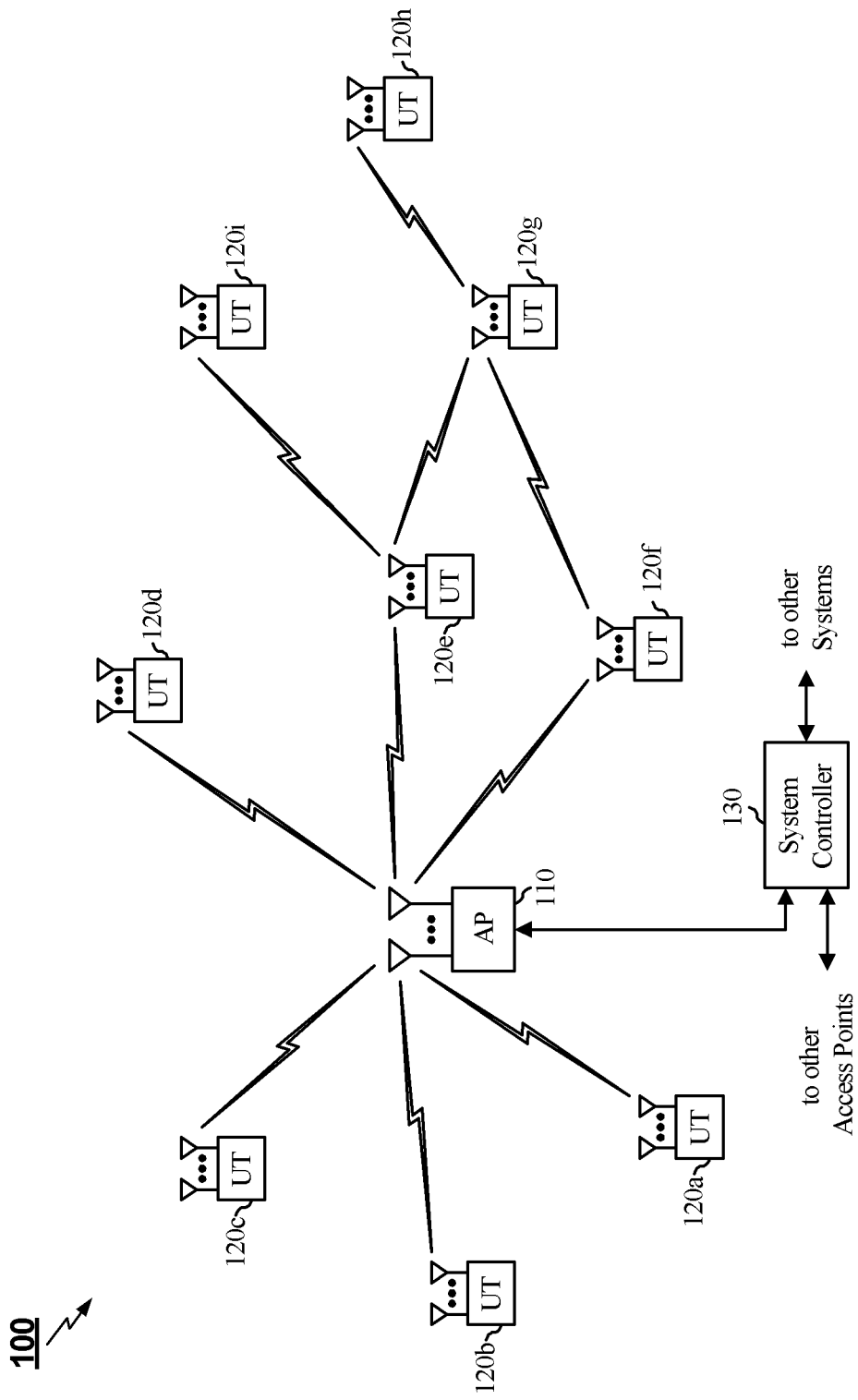
FIG. 1 illustrates a multiple-access multiple-input multiple-output (MIMO) system with access points and wireless communication devices.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, multiple-access multiple-input multiple-output (MIMO), some combination thereof, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices:

access points (APs) and clients (also referred to as stations (STAs)). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An AP may comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A station (STA) may also comprise, be implemented as, or known as a user terminal, an access terminal (AT), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals, and a user terminal or STA may be fixed or mobile, and may be referred to herein as simply a wireless communication device. The access point 110 may communicate with one or more wireless communication device 120 (illustrated as UTs 120a-i) at any given moment on the downlink (DL) and uplink (UL). The downlink (i.e., forward link) is the communication link from the access point 110 to the wireless communication devices 120, and the uplink (i.e., reverse link) is the communication link from the wireless communication devices 120 to the access point 110. A wireless communication device 120 may also communicate peer-to-peer with another wireless communication device 120. A system controller 130 couples to and provides coordination and control for the access points 110.

While portions of the following disclosure will describe wireless communication device 120 capable of communicating via Spatial Division Multiple Access (SDMA), for certain aspects, the wireless communication devices 120 may also include some wireless communication devices 120 that do not support SDMA. Thus, for such aspects, the AP 110 may be configured to communicate with both SDMA and non-SDMA user terminals. This approach may conveniently allow older versions of wireless communication devices 120 ("legacy" stations) that do not support SDMA to remain deployed in an enterprise, extending their useful lifetime, while allowing newer SDMA wireless communication devices to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected wireless communication devices 120 collectively represents the multiple-output for downlink transmissions and the multiple-input for uplink transmissions. For pure SDMA, it is desired to have $N_{ap} \geq K \geq 1$ if the data symbol streams for the K wireless communication devices are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected wireless communication device may transmit user-specific data to and/or receive user-specific data from the access point. In general, each selected wireless communication device may be equipped with one or multiple antennas (i.e., $N_{ut} \geq 1$). The K selected wireless communication devices can have the same number of antennas, or one or more wireless communication devices may have a different number of antennas.

The system 100 may be a SDMA system according to a time division duplex (TDD) or a frequency division duplex (FDD). For a TDD system, the downlink and uplink share the same frequency band. For an FDD system, the downlink and uplink use different frequency bands. The system 100 may also be a MIMO system utilizing a single carrier or multiple carriers for transmission. Each wireless communication device 120 may be equipped with a single antenna (e.g., in order to keep costs down) or multiple antennas (e.g., where the additional cost can be supported). The system 100 may also be a TDMA system if the wireless communication devices 120 share the same frequency channel by dividing transmission/reception into different time slots, where each time slot may be assigned to a different wireless communication device 120.

Figure 2:
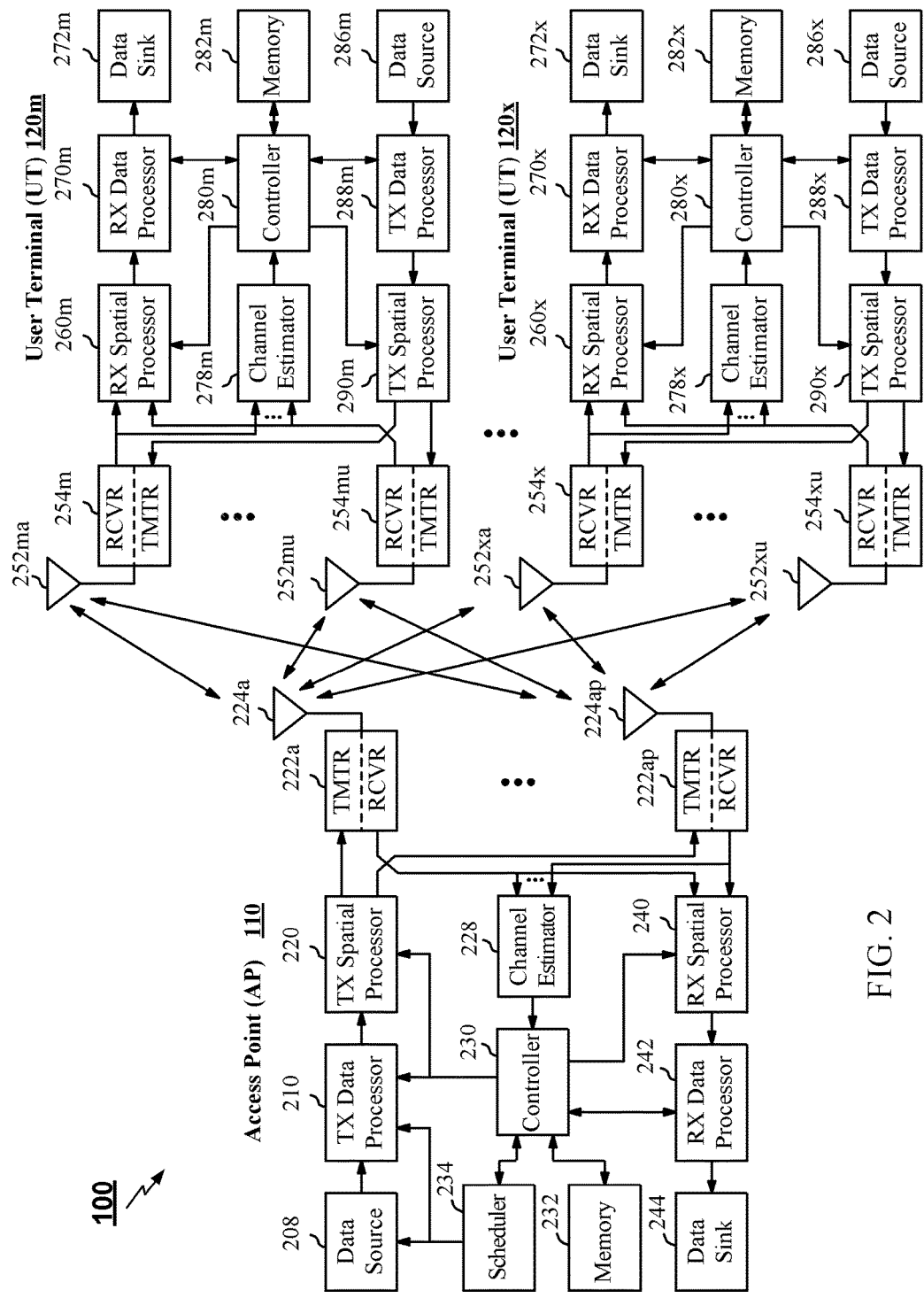
FIG. 2 illustrates a block diagram of the access point and two wireless communication devices in the MIMO system of FIG. 1.

FIG. 2 illustrates a block diagram of the access point 110 and two wireless communication devices (illustrated as user terminal 120m and user terminal 120x) in system 100 (illustrated as a MIMO system). The access point 110 is equipped with $N_t$ antennas 224a and 224ap. The user terminal 120m is equipped with $N_{ut,m}$ antennas $252_{ma}$ and $252_{ma}$, and the user terminal 120x is equipped with $N_{ut,x}$ antennas $252_{xa}$ and $252_{xu}$. The access point 110 is a transmitting entity for the downlink and a receiving entity for the uplink. The wireless communication devices 120 are transmitting entities for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ wireless communication devices 120 are selected for simultaneous transmission on the uplink, and $N_{dn}$ wireless communication devices 120 are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the wireless communication devices 120.

On the uplink, at each wireless communication device 120 selected for uplink transmission, a TX data processor 288 receives traffic data from a data source 286 and control data from a controller 280. The TX data processor 288 processes (e.g., encodes, interleaves, and modulates) the traffic data for the wireless communication device 120 based on the coding and modulation schemes associated with the rate selected for the wireless communication device 120 and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ receiver/transmitter units 254 provide $N_{ut,m}$ uplink signals for transmission from $N_{ut,m}$ antennas 252, for example to transmit to the access point 110.

$N_{up}$ wireless communication devices 120 may be scheduled for simultaneous transmission on the uplink. Each of these wireless communication devices 120 may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ wireless communication device 120 transmitting on the uplink. Each antenna 224 provides a received signal to a respective receiver unit (RCVR) 222. Each receiver/transmitter unit 222 performs processing complementary to that performed by receiver/transmitter unit 254 and provides a received symbol stream. An RX spatial processor 240 performs receiver spatial processing on the $N_{up}$ received symbol streams from $N_{up}$ receiver/transmitter units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each wireless communication device 120 may be provided to a data sink 244 for storage and/or a controller 230 for further processing.

On the downlink, at the access point 110, a TX data processor 210 receives traffic data from a data source 208 for $N_{dn}$ wireless communication devices 120 scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless communication device 120 based on the rate selected for that wireless communication device 120. The TX data processor 210 provides $N_{dn}$ downlink data symbol streams for the $N_{dn}$ wireless communication devices 120. A TX spatial processor 220 performs spatial processing (such as a precoding or beamforming) on the $N_{dn}$ downlink data symbol streams, and provides $N_{up}$ transmit symbol streams for the $N_{up}$ antennas. Each receiver/transmitter unit 222 receives and processes a respective transmit symbol stream to generate a downlink signal. $N_{up}$ receiver/transmitter units 222 may provide $N_{up}$ downlink signals for transmission from $N_{up}$ antennas 224, for example to transmit to the wireless communication devices 120.

At each wireless communication device 120, $N_{ut,m}$ antennas 252 receive the $N_{up}$ downlink signals from the access point 110. Each receiver/transmitter unit 254 processes a received signal from an associated antenna 252 and provides a received symbol stream. An RX spatial processor 260 performs receiver spatial processing on $N_{ut,m}$ received symbol streams from $N_{ut,m}$ receiver/transmitter units 254 and provides a recovered downlink data symbol stream for the wireless communication device 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the wireless communication device 120.

At each wireless communication device 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the wireless communication device 120 based on the downlink channel response matrix $H_{dn,m}$ for that wireless communication device 120. Controller 230 derives the spatial filter matrix for the access point 110 based on the effective uplink channel response matrix $H_{up,eff}$. The controller 280 for each wireless communication device 120 may send feedback information (e.g., the downlink and/or uplink eigenvectors, eigenvalues, SNR estimates, and so on) to the access point 110. The controllers 230 and 280 may also control the operation of various processing units at the access point 110 and wireless communication devices 120, respectively.

Figure 3:
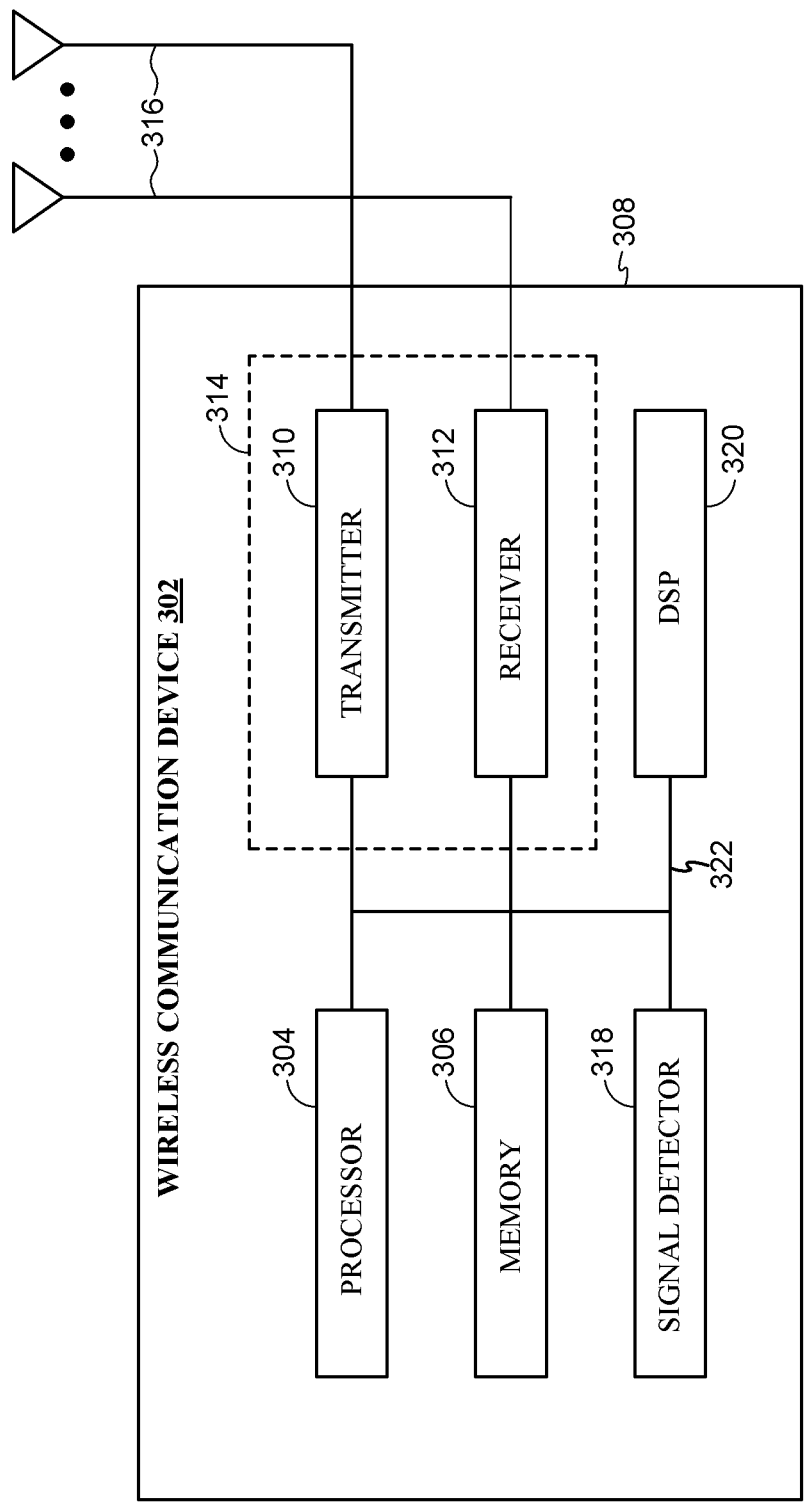
FIG. 3 illustrates various components that may be utilized in a wireless communication device that may be employed within a wireless communication system.

FIG. 3 illustrates various components that may be utilized in a wireless communication device 302 that may be employed within the wireless communication system 100. The wireless communication device 302 is an example of a device that may be configured to implement the various methods described herein. The wireless communication device 302 may implement an access point 110 or a wireless communication device 120.

The wireless communication device 302 may include a processor 304 which controls operation of the wireless communication device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless communication device 302 may also include a housing 308 that may include a transmitter 310 and a receiver 312 to allow transmission and reception of data between the wireless communication device 302 and a remote location. The transmitter 310 and receiver 312 may be combined into a transceiver 314. A single or a plurality of transceiver antennas 316 may be attached to the housing 308 and electrically coupled to the transceiver 314. The wireless communication device 302 may also include (not shown) multiple transmitters, multiple receivers, and multiple transceivers.

The wireless communication device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless communication device 302 may also include a digital signal processor (DSP) 320 for use in processing signals.

The various components of the wireless communication device 302 may be coupled together by a bus system 322, which may include a power bus, a control signal bus, and a status signal bus in addition to a data bus.

Certain aspects of the present disclosure support transmitting uplink (UL) channel state information (CSI) from multiple STAs to an AP. In some embodiments, the UL CSI may be transmitted in a multi-user MIMO (MU-MIMO) system. Alternatively, the UL CSI may be transmitted in a multi-user FDMA (MU-FDMA), multi-user OFDMA (MU-OFDMA) or similar FDMA system. Specifically, FIGS. 4A-D, FIGS. 5A-B, and FIG. 6 illustrate UL-MU-MIMO transmissions 410A and 410B that could apply equally to UL-FDMA, UL-OFDMA, or similar UL FDMA system transmissions. In these embodiments, UL-MU-MIMO, UL-OFDMA, or similar UL FDMA system transmissions can be sent simultaneously from multiple STAs to an AP and may create efficiencies in wireless communication.

The sounding procedure described herein comprises at least an "announcement frame" (or "null data packet announcement (NDPA) frame") and a "CSI frame," and may further comprise a "null data packet (NDP) frame," a "trigger frame" (or "clear to transmit (CTX) frame"), and a "report poll frame." In the context of 802.11 specifications, the "frame" may be identified as a physical layer convergence protocol data unit (PPDU), a medium access control protocol data unit (MPDU), or some portion thereof (e.g., a header or preamble of a PPDU or MPDU). The announcement frame(s) may convey at least sounding announcement information which instructs the STAs on whether/how to compute the CSI, and UL-SU or UL-MU resource allocation information which instructs the STAs on how to send the CSI by using UL-MU-MIMO or UL-OFDMA.

The sounding announcement may comprise a PPDU carrying sounding announcement information in the medium access control (MAC) payload or in its PHY header. The sounding announcement information may comprise identifiers of the STAs that are to report the CSI, and may comprise additional parameters of information useable for the computation and transmissions of the CSI. The sounding NDP frame provides a reference signal that allows STAs to estimate the channel between the one or more antennas of the transmitter and the one or more antennas of the STA and may be an 802.11ax NDP frame, an 802.11ac NDP frame, an 802.11n NDP frame, an 802.11ah NDP frame, or other 802.11 based NDP frame. In various aspects, the format of the NDP frame may be similar to the frame 900 discussed herein with respect to FIG. 9. In one embodiment, the announcement may include the reference signaling for channel estimation, so that the NDP frame may not be sent.

In some embodiments, CSI may comprise known channel properties of a communication link. In some aspects the CSI may describe how a signal propagates and represents the combined effect of, for example, scattering, fading, and power decay with distance. For example, for MU-MIMO transmissions, the CSI may comprise one or more of a beamforming matrix, received signal strength, and other information that allows weighting of antennas to mitigate interference in the spatial domain.

Figure 4A:
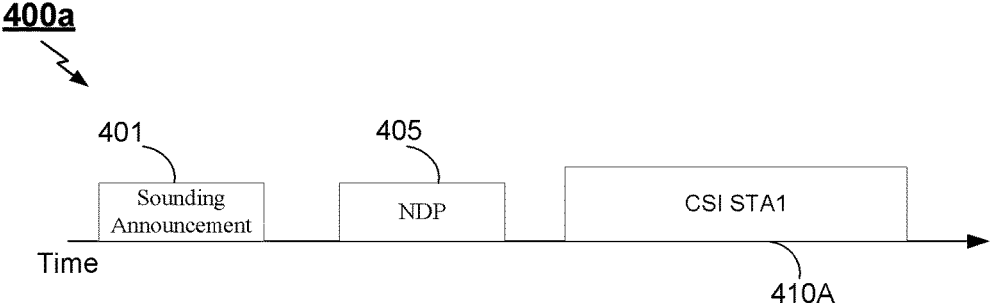
FIG. 4A shows a time diagram of an example frame exchange of channel state information (CSI) feedback.

FIG. 4A is a time sequence diagram illustrating an example of a frame exchange 400a of channel state information (CSI) feedback between an AP 110 and a wireless communication device 120 (e.g., wireless communication device 120a of FIG. 1, illustrated as STA1 in FIG. 4A) in a single user (SU) environment. As shown in FIG. 4A, and in conjunction with FIG. 1, an AP 110 may transmit a sounding announcement 401 to a wireless communication device 120 indicating that a sounding frame is forthcoming (sounding NDP 405, as shown in FIG. 4A), that the wireless communication device 120 is the intended recipient of the forthcoming sounding frame, and the format thereof. In some embodiments, the sounding announcement 401 may not indicate the presence of the forthcoming sounding NDP 405, and the sounding NDP 405 may indicate itself that it is a sounding NDP 405. In other embodiments, neither the sounding announcement 401 nor the sounding NDP 405 indicates that the sounding NDP 405 is a sounding NDP, and the wireless communication device 120 may instead determine on their own that the sounding NDP 405 is a sounding NDP. In an exemplary embodiment, sounding announcement 401 is an NDPA contained in a PPDU. In some aspects, sounding announcement 401 indicates that sounding NDP 405 is an HE NDP or a VHT NDP. This indication may comprise one or more bits in the sounding announcement 401. In one embodiment, a reserved bit in the NDPA sounding dialog token field is used to indicate that sounding NDP 405 is an HE NDP, or that sounding NDP 405 is a VHT NDP. In another embodiment, AP 110 designates a specific value of the dialog token field to indicate HE sounding or VHT sounding. In accordance with any of these embodiments, the wireless communication devices 120 receiving the sounding NDP 405 know whether to respond with CSI using HE sounding or VHT sounding.

In some embodiments, the sounding announcement 401 may also instruct the recipient wireless communication device 120 to respond simultaneously after the sounding NDP 405. In various aspects, the wireless communication device 120 may be instructed to respond a short interframe space (SIFS) time period after receiving the sounding NDP 405. The sounding announcement 401 may further instruct the wireless communication device 120 to use legacy (e.g., 802.11ac), UL-MU-MIMO, UL-OFDMA, or a combination thereof, and the corresponding parameters for transmission of CSI (e.g., for CSI transmission 410A). The sounding announcement 401 may be transmitted in accordance with a format similar to the frame 700 or 701 discussed herein with respect to FIG. 7A or 7B.

The AP 110 may then transmit the sounding NDP 405 following the sounding announcement 401. In response to the sounding NDP 405, the wireless communication device 120 may transmit CSI to the AP 110. Specifically, the wireless communication device 120 identified by the sounding announcement 401 may estimate the channel based on the sounding NDP 405 and send a representation of the estimated channel in a sounding feedback CSI transmission. In FIG. 4A, STA1 transmits CSI transmission 410A to the AP 110. The CSI transmission 410 may be a legacy transmission, UL-MU-MIMO transmission, UL-OFDMA transmission, or some combination thereof. Upon receiving the CSI transmission 410A, the AP 110 may accurately determine information about the channel from the AP 110 to the wireless communication device 120 (e.g., STA1). The sounding NDP 405 may be transmitted in accordance with a format similar to the format of frame 900 discussed herein with respect to FIG. 9. In some aspects, sounding NDP 405 may be a high-efficiency NDP (HE NDP). In various aspects, the time in between the sounding announcement 401 and the sounding NDP 405 may be a SIFS time period and the timing in between the sounding NDP 405 and the CSI transmission 410A may be a SIFS (or point interframe space (PIFS)) time period. In other aspects, single user or multi-user beamforming report (SU BR or MU BR) polls may be used to request CSI from the wireless communication devices 120.

Figure 4B:
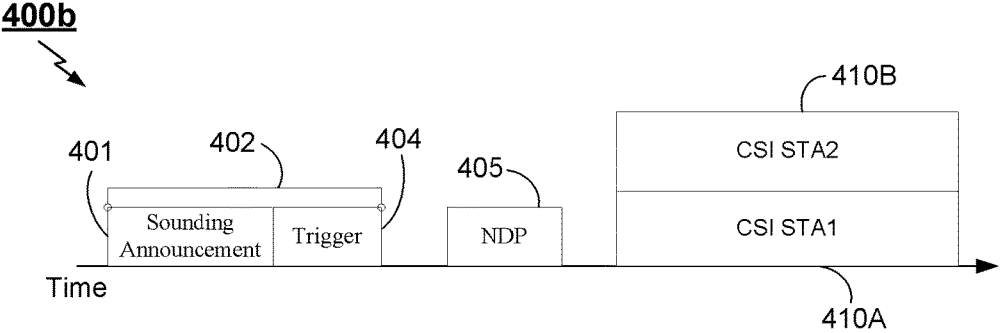
FIG. 4B shows a time diagram of another example frame exchange of CSI feedback.

FIG. 4B is a time sequence diagram illustrating an example of a frame exchange 400*b* of CSI feedback between an AP 110 and multiple wireless communication devices 120 (e.g., wireless communication devices 120*a* and 120*b* of FIG. 1, illustrated as STA1 and STA2 in FIG. 4B). Frame exchange 400*b* may be similar to frame exchange 400*a* of FIG. 4A, but may use an MU-MIMO or OFDMA protocol to determine and communicate CSI with multiple wireless communication devices 120. As shown in FIG. 4B, and in conjunction with FIG. 1, an AP 110 may transmit packet 402 to the wireless communication devices 120. Packet 402 may comprise a sounding announcement 401 indicating which wireless communication devices 120 are the intended recipients and the format of the forthcoming sounding frame (sounding NDP 405, as shown in FIG. 4B). In some aspects, the wireless communication devices 120 indicated in the sounding announcement 401 may be only of a particular set of capabilities. In one embodiment, wireless communication devices 120 indicated in the sounding announcement 401 may be HE STAs. In an exemplary embodiment, sounding announcement 401 is an NDPA contained in packet 402, which is a PPDU. In accordance with this embodiment, a bit (or bits) in the PPDU may indicate to the wireless communication devices 120 that MU sounding is used so that the wireless communication devices 120 do not immediately respond with single user CSI. In other embodiments, a fake allocation identifier (AID) may be contained in the first station AID field of the sounding announcement 401 so that no wireless communication devices respond immediately after receiving the sounding NDP 405 with single user CSI. This fake AID may also be referred to herein as a reserved field. In some aspects, sounding announcement 401 indicates that sounding NDP 405 is an HE NDP or a VHT NDP. This indication may comprise one or more bits in the sounding announcement 401. In one embodiment, a reserved bit in the NDPA sounding dialog token field is used to indicate that sounding NDP 405 is an HE NDP, or that sounding NDP 405 is a VHT NDP. In another embodiment, AP 110 designates a specific value of the dialog token field to indicate HE sounding or VHT sounding. In accordance with any of these embodiments, the wireless communication devices 120 receiving the sounding NDP 405 know whether to respond with CSI using HE sounding or VHT sounding.

In some embodiments, the sounding announcement 401 may also instruct some or all of the recipient wireless communication devices 120 to respond simultaneously after the sounding NDP 405. In various aspects, the wireless communication devices 120 may be instructed to respond a SIFS time period after receiving the sounding NDP 405. The sounding announcement 401 may further instruct the wireless communication devices 120 to use UL-MU-MIMO, UL-OFDMA, or a combination of both and the corresponding parameters for transmission of CSI (e.g., for CSI transmissions 410A and 410B). The sounding announcement 401 may be transmitted in accordance with a format similar to frame 700 or 701 discussed herein with respect to FIG. 7A or 7B.

Packet 402 may also comprise a trigger frame 404. In various aspects, the trigger frame 404 may indicate which wireless communication devices 120 are to participate in the frame exchange 400*b*, such that a particular wireless communication device 120 knows to start a transmission (e.g., transmission 410A or 410B). In some aspects, the trigger frame 404 may provide an indication of a resource allocation to the wireless communication devices 120 for the transmission of the CSI requested by the AP 110, or for other uplink transmissions. In some embodiments, the indication of the resource allocation is an indication of a spatial stream or frequency bandwidth allocated to the wireless communication device 120, which may be a specific tone or sub-band allocation. The sounding announcement 401 may be aggregated with the trigger frame 404. For example, the sounding announcement 401 and the trigger frame 404 may each be transmitted within a payload of the same PPDU transmission (e.g., packet 402). In another example, the trigger frame 404 is sent after the sounding announcement 401 without any time between the transmissions. The trigger frame 404 may be transmitted in accordance with a format similar to the frame 800 discussed herein with respect to FIG. 8.

The AP 110 may then transmit the sounding NDP 405 following packet 402. In response to the sounding NDP 405, the wireless communication devices 120 may transmit CSI to the AP 110. Specifically, the wireless communication devices 120 identified by the sounding announcement 401 may estimate the channel based on the sounding NDP 405 and send a representation of the estimated channel in a sounding feedback CSI transmission. In FIG. 4B, STA1 and STA2 concurrently transmit CSI transmissions 410A and 410B to the AP 110. The CSI transmissions 410A and 410B may be UL-MU-MIMO transmissions, UL-OFDMA transmissions, or some combination thereof. In some embodiments, the concurrent transmissions may occur at the same time or within a certain threshold time period. These concurrent transmissions may utilize the resource allocation provided in the trigger frame 404. Upon receiving the CSI transmissions 410A and 410B, the AP 110 may accurately determine information about the channel from the AP 110 to each of the wireless communication devices 120 (e.g., STA1 and STA2). The sounding NDP 405 may be transmitted in accordance with a format similar to the format of frame 900 discussed herein with respect to FIG. 9. In one embodiment, sounding NDP 405 may comprise a bit or bits indicating that a MU CSI response is requested from the wireless communications devices 120. In some aspects, sounding NDP 405 may be an HE NDP. In various aspects, the time in between the sounding announcement 401 and the sounding NDP 405 may be a SIFS time period and the timing in between the sounding NDP 405 and the CSI transmissions 410A and 410B may be a SIFS (or PIFS) time period.

In some aspects, the AP 110 may utilize packet 402 in order to request CSI for a tone or sub-band of the spatial stream or frequency bandwidth from each wireless communication device 120. For example, sounding announcement 401 or sounding NDP 405 may contain an indication of a sub-band for which CSI is requested, per each wireless communication device 120. In one embodiment, the spatial stream or bandwidth allocated to each wireless communication device 120 in the trigger frame 404 may indicate that CSI is requested from the wireless communication device 120 for that spatial stream or bandwidth. Accordingly, the wireless communication devices 120 may respond with the requested CSI for the spatial stream or bandwidth in transmissions 410A and 410B.

In some aspects, the sounding announcement 401 and trigger frame 404 are sent on 20/40/80/160 MHz even though the wireless communication device 120 is only requested to report a portion of the bandwidth. In other aspects, the sounding announcement 401 may be sent to each of the wireless communication devices 120 on a sub-band per each wireless communication device 120 or group of wireless communication devices 120 that are allocated to that sub-band. The sounding announcement 401 may be contained in a MAC frame of the PPDU (e.g., packet 402), or may contain an indication in the header of the PPDU. Each wireless communication device 120 may compute the CSI for the sub-band on which the sounding announcement 401 was received. In accordance with this embodiment, the sounding NDP may be sent on 20/40/80/ 160 MHz. Thereafter, the wireless communication devices 120 may reply with the CSI in transmissions 410A and 410B. In one embodiment, the downlink bandwidth and uplink bandwidth may be the same. The above described embodiments may also be combined. For example, a different sounding announcement 401 may be sent on each 20 mHz sub-band, and may also indicate a sub-band for the CSI, per each wireless communication device 120. Although the above embodiments requesting CSI or only a tone or sub-band are not described in detail with respect to FIGS. 4A, 4C-D, 5A-B, and 6, one of skill in the art would appreciate that these embodiments may also apply thereto in the same or a similar manner.

Figure 4C:
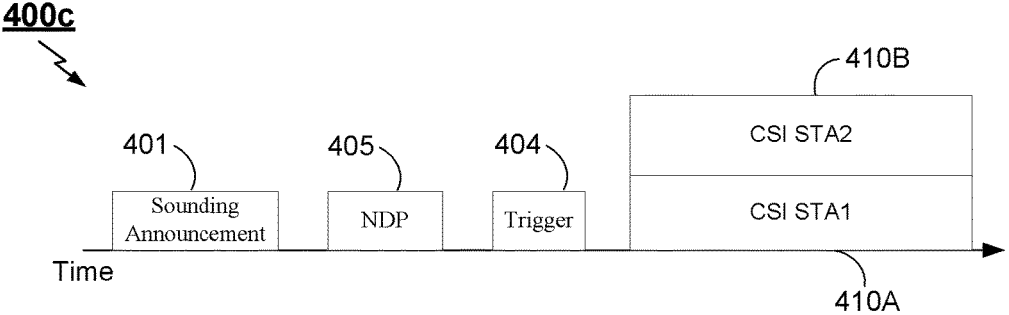
FIG. 4C shows a time diagram of another example frame exchange of CSI feedback.

FIG. 4C is a time sequence diagram illustrating another example of a frame exchange 400c of CSI feedback between an AP 110 and multiple wireless communication devices 120 (e.g., wireless communication devices 120a and 120b of FIG. 1, illustrated as STA1 and STA2 in FIG. 4C). Frame exchange 400c may use an MU-MIMO or OFDMA protocol to determine and communicate CSI with multiple wireless communication devices 120. As shown in FIG. 4C, and in conjunction with FIG. 1, an AP 110 may transmit a sounding announcement 401 to the wireless communication devices 120 indicating which wireless communication devices 120 are the intended recipients and the format of the forthcoming sounding frame (sounding NDP 405, as shown in FIG. 4C). In an exemplary embodiment, sounding announcement 401 is a PPDU comprising an NDPA. In some aspects, sounding announcement 401 indicates that sounding NDP 405 is an HE NDP or a VHT NDP. This indication may comprise one or more bits in the sounding announcement 401. In one embodiment, a reserved bit in the NDPA sounding dialog token field is used to indicate that sounding NDP 405 is an HE NDP, or that sounding NDP 405 is a VHT NDP. In another embodiment, AP 110 designates a specific value of the dialog token field to indicate HE sounding or VHT sounding. In accordance with any of these embodiments, the wireless communication devices 120 receiving the sounding NDP 405 know whether to respond with CSI using HE sounding or VHT sounding.

In some embodiments, the sounding announcement 401 may also instruct some or all of the recipient wireless communication devices 120 to respond simultaneously after a trigger frame 404. In various aspects, the wireless communication devices 120 may be instructed to respond a SIFS time period after receiving the trigger frame 404. The sounding announcement 401 may further instruct the wireless communication devices 120 to use UL-MU-MIMO, UL-OFDMA, or a combination of both and the corresponding parameters for transmission of CSI (e.g., for CSI transmissions 410A and 410B). The sounding announcement 401 may be transmitted in accordance with a format similar to frame 700 or 701 discussed herein with respect to FIG. 7A or 7B.

The AP 110 may then transmit the sounding NDP 405 following the sounding announcement 401. AP may also transmit the trigger frame 404 following the sounding NDP 405. In response to the trigger frame 404, the wireless communication devices 120 may transmit CSI to the AP 110. Specifically, the wireless communication devices 120 identified by the sounding announcement 401 may estimate the channel based on the sounding NDP 405 and send a representation of the estimated channel in a sounding feedback CSI transmission. In FIG. 4C, STA1 and STA2 concurrently transmit CSI transmissions 410A and 410B to the AP 110. The CSI transmissions 410A and 410B may be UL-MU-MIMO transmissions, UL-OFDMA transmissions, or some combination thereof. In some embodiments, the concurrent transmissions may occur at the same time or within a certain threshold time period. These concurrent transmissions may utilize the resource allocation provided in the trigger frame 404. Upon receiving the CSI transmissions 410A and 410B, the AP 110 may accurately determine information about the channel from the AP 110 to each of the wireless communication devices 120 (e.g., STA1 and STA2). The sounding NDP 405 may be transmitted in accordance with a format similar to the format of frame 900 discussed herein with respect to FIG. 9. In some aspects, sounding NDP 405 may be an HE NDP. The trigger frame 404 may be transmitted in accordance with a format similar to the format of frame 800 discussed herein with respect to FIG. 8. In various aspects, the time in between the sounding announcement 401 and the sounding NDP 405 may be a SIFS time period, the time in between the sounding NDP 405 and the trigger frame 404 may be a SIFS time period, and the timing in between the trigger frame 404 and the CSI transmissions 410A and 410B may be a SIFS (or PIFS) time period.

Figure 4D:
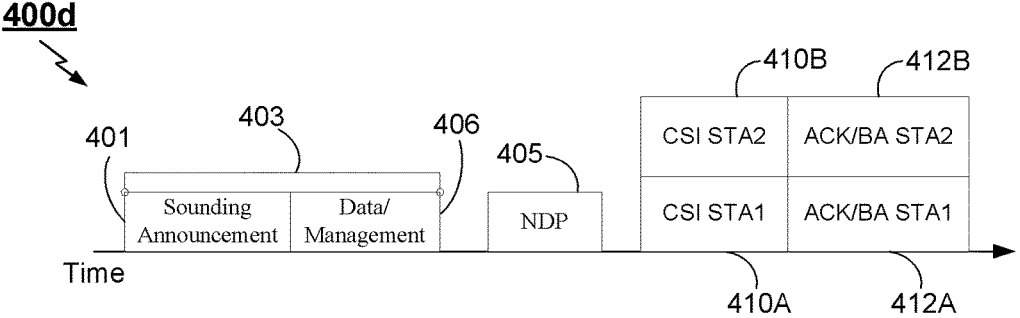
FIG. 4D shows a time diagram of another example frame exchange of CSI feedback.

FIG. 4D is a time sequence diagram illustrating another example of a frame exchange 400d of CSI feedback between an AP 110 and multiple wireless communication devices 120 (e.g., wireless communication devices 120a and 120b of FIG. 1, illustrated as STA1 and STA2 in FIG. 4D). Frame exchange 400d may use an MU-MIMO or OFDMA protocol to determine and communicate CSI, and to transmit data and acknowledgment (ACK) information thereof with multiple wireless communication devices 120. As shown in FIG. 4D, and in conjunction with FIG. 1, an AP 110 may transmit packet 403 to the wireless communication devices 120. Packet 403 may comprise a sounding announcement 401 sent to the wireless communication devices 120 and indicating which wireless communication devices 120 are the intended recipients and the format of the forthcoming sounding frame (sounding NDP 405, as shown in FIG. 4D). In an exemplary embodiment, sounding announcement 401 is a PPDU comprising an NDPA. In some aspects, sounding announcement 401 indicates that sounding NDP 405 is an HE NDP or a VHT NDP. This indication may comprise one or more bits in the sounding announcement 401. In one embodiment, a reserved bit in the NDPA sounding dialog token field is used to indicate that sounding NDP 405 is an HE NDP, or that sounding NDP 405 is a VHT NDP. In another embodiment, AP 110 designates a specific value of the dialog token field to indicate HE sounding or VHT sounding. In accordance with any of these embodiments, the wireless communication devices 120 receiving the sounding NDP 405 know whether to respond with CSI using HE sounding or VHT sounding.

In some embodiments, the sounding announcement 401 may also instruct some or all of the recipient wireless communication devices 120 to respond simultaneously after the sounding NDP 405. In various aspects, the wireless communication devices 120 may be instructed to respond a SIFS time period after receiving the sounding NDP 405. The sounding announcement 401 may further instruct the wireless communication devices 120 to use UL-MU-MIMO, UL-OFDMA, or a combination of both and the corresponding parameters for transmission of CSI (e.g., for CSI transmissions 410A and 410B). The sounding announcement 401 may be transmitted in accordance with a format similar to frame 700 or 701 discussed herein with respect to FIG. 7A or 7B.

As shown in FIG. 4D, packet 403 may also comprise data or management information 406. This data or management information 406 may be transmitted to the wireless communication devices 120 along with the sounding announcement 401 in order to cut down on overhead in the wireless communication system (e.g., system 100).

The AP 110 may then transmit the sounding NDP 405 following the sounding announcement 401. AP may also transmit the trigger frame 404 following the sounding NDP 405. In response to the trigger frame 404, the wireless communication devices 120 may transmit CSI to the AP 110. Specifically, the wireless communication devices 120 identified by the sounding announcement 401 may estimate the channel based on the sounding NDP 405 and send a representation of the estimated channel in a sounding feedback CSI transmission. In FIG. 4D, STA1 and STA2 concurrently transmit CSI transmissions 410A and 410B to the AP 110. The CSI transmissions 410A and 410B may be UL-MU-MIMO transmissions, UL-OFDMA transmissions, or some combination thereof. In some embodiments, the concurrent transmissions may occur at the same time or within a certain threshold time period. These concurrent transmissions may utilize the resource allocation provided in the trigger frame 404. Upon receiving the CSI transmissions 410A and 410B, the AP 110 may accurately determine information about the channel from the AP 110 to each of the wireless communication devices 120 (e.g., STA1 and STA2). If data or management information 406 is transmitted, then the wireless communication devices 120 may also transmit acknowledgment (ACK) or block acknowledgment (BA) of the data or management information 406 to the AP 110 in transmissions 412A and 412B. The sounding NDP 405 may be transmitted in accordance with a format similar to the format of frame 900 discussed herein with respect to FIG. 9. In some aspects, sounding NDP 405 may be an HE NDP. In various aspects, the time in between the sounding announcement 401 and the sounding NDP 405 may be a SIFS time period and the timing in between the sounding NDP 405 and the CSI transmissions 410A and 410B may be a SIFS (or PIFS) time period.

Figure 5A:
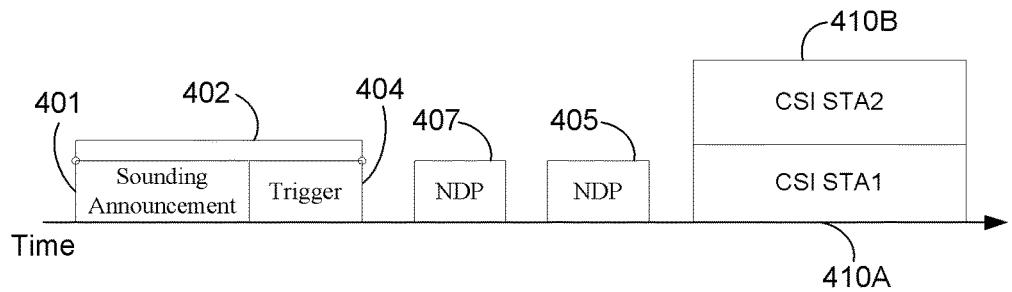
FIG. 5A shows a time diagram of another example frame exchange of CSI feedback.

FIG. 5A is a time sequence diagram illustrating another example of a frame exchange 500a of CSI feedback between an AP 110 and multiple wireless communication devices 120 (e.g., wireless communication devices 120a and 120b of FIG. 1, illustrated as STA1 and STA2 in FIG. 5A). Frame exchange 500a may use a legacy, MU-MIMO, or OFDMA protocol to determine and communicate CSI with one or more wireless communication devices 120. As shown in FIG. 5A, and in conjunction with FIG. 1, an AP 110 may transmit packet 402 to the wireless communication devices 120. Packet 402 may comprise a sounding announcement 401 indicating which wireless communication devices 120 are the intended recipients and the format of the forthcoming sounding frame(s) (sounding NDP 407 and sounding NDP 405, as shown in FIG. 5A). In an exemplary embodiment, packet 402 is a PPDU, and sounding announcement 401 is a portion thereof, comprising an NDPA. In some aspects, sounding announcement 401 indicates that sounding NDP 405 is an HE NDP, that sounding NDP 407 is a VHT NDP, or both. These indications may comprise one or more bits in the sounding announcement 401. In one embodiment, a reserved bit in the NDPA sounding dialog token field is used to indicate that sounding NDP 405 is an HE NDP, that sounding NDP 407 is a VHT NDP, or both. In another embodiment, AP 110 designates a specific value of the dialog token field to indicate HE sounding, VHT sounding, or both. In accordance with any of these embodiments, the wireless communication devices 120 receiving sounding NDP 405 or sounding NDP 407 know whether to respond with CSI using HE sounding, VHT sounding, or some combination thereof.

In some embodiments, the sounding announcement 401 may also instruct some or all of the recipient wireless communication devices 120 to respond simultaneously after sounding NDP 405. In various aspects, the wireless communication devices 120 may be instructed to respond a SIFS time period after receiving the sounding NDP 405. The sounding announcement 401 may further instruct the wireless communication devices 120 to use a legacy PPDU, UL-MU-MIMO, UL-OFDMA, or a combination thereof and the corresponding parameters for transmission of CSI (e.g., for CSI transmissions 410A and 410B). The sounding announcement 401 may be transmitted in accordance with a format similar to the format of frame 700 or 701 discussed herein with respect to FIG. 7A or 7B.

Packet 402 may also comprise a trigger frame 404. In various aspects, the trigger frame 404 may indicate which wireless communication devices 120 are to participate in the frame exchange 500*a*, such that a particular wireless communication device 120 knows to start a transmission (e.g., transmission 410A or 410B). In some aspects, the trigger frame 404 may provide an indication of a resource allocation to the wireless communication devices 120 for the transmission of the CSI requested by the AP 110. In some embodiments, the indication of the resource allocation is an indication of a spatial stream or frequency bandwidth allocated to the wireless communication device 120, which may be a specific tone or sub-band allocation. The sounding announcement 401 may be aggregated with the trigger frame 404. For example, the sounding announcement 401 and the trigger frame 404 may each be transmitted within a payload of the same PPDU transmission (e.g., packet 402). In another example, the trigger frame 404 is sent after the sounding announcement 401 without any time between the transmissions. The trigger frame 404 may be transmitted in accordance with a format similar to the frame 800 discussed herein with respect to FIG. 8.

The AP 110 may then transmit the sounding NDP 407 following the transmission of the sounding announcement 401 and the trigger frame 404. AP may also transmit the sounding NDP 405 following the sounding NDP 407. Multiple sounding NDPs may be used so that wireless communication devices 120 of a first set of capabilities may estimate the channel based on the sounding NDP 407, and so that wireless communication devices 120 of a second set of capabilities may estimate the channel based on the sounding NDP 405. In one exemplary embodiment, sounding NDP 407 is useable by very-high-throughput (VHT) devices, and sounding NDP 405 is useable by HE devices. In response to the sounding NDP 405, the wireless communication devices 120 may transmit CSI to the AP 110. Specifically, the wireless communication devices 120 identified by the sounding announcement 401 may estimate the channel based on sounding NDP 405 and sounding NDP 407, and send a representation of the estimated channel in a sounding feedback CSI transmission. In embodiment where only indoor usage is contemplated, VHT sounding NDP 407 may be transmitted, and a HE sounding NDP 405 may not be transmitted. In FIG. 5A, STA1 and STA2 concurrently transmit CSI transmissions 410A and 410B to the AP 110. The CSI transmissions 410A and 410B may be legacy transmissions, UL-MU-MIMO transmissions, UL-OFDMA transmissions, or some combination thereof. In some embodiments, the concurrent transmissions may occur at the same time or within a certain threshold time period. These concurrent transmissions may utilize the resource allocation provided in the trigger frame 404. Upon receiving the CSI transmissions 410A and 410B, the AP 110 may accurately determine information about the channel from the AP 110 to each of the wireless communication devices 120 (e.g., STA1 and STA2). The sounding NDP 405 may be transmitted in accordance with a format similar to the format of frame 900 discussed herein with respect to FIG. 9. In some aspects, sounding NDP 405 may be an HE NDP, and sounding NDP 407 may be a VHT NDP in accordance with 802.11ac. In various aspects, the time in between packet 402 and the sounding NDP 407 may be a SIFS time period, the time in between the sounding NDP 407 and the sounding NDP 405 may be a SIFS time period, and the timing in between the sounding NDP 405 and the CSI transmissions 410A and 410B may be a SIFS (or PIFS) time period.

In some aspects, sounding announcement 401 may comprise an NDPA which can be understood by STAs of both capabilities. In one embodiment, this NDPA is a VHT NDPA, or a modified VHT NDPA. In accordance with this embodiment, the NDPA needs to make sure no VHT wireless communication devices 120 respond immediately after the sounding NDP 407. In some aspects, this is achieved by setting the AID in the first STA info field of the NDPA to a value that does not correspond to a VHT wireless communication devices 120. In other aspects, this is achieved by setting the AID in the first STA info field of the NDPA to a value not corresponding to any VHT or HE wireless communication devices 120. Although the above embodiments altering the response time of wireless communication devices 120 may not described in detail with respect to FIGS. 4A-D, 5B, and 6, one of skill in the art would appreciate that these embodiments may also apply thereto in the same or a similar manner.

Figure 5B:
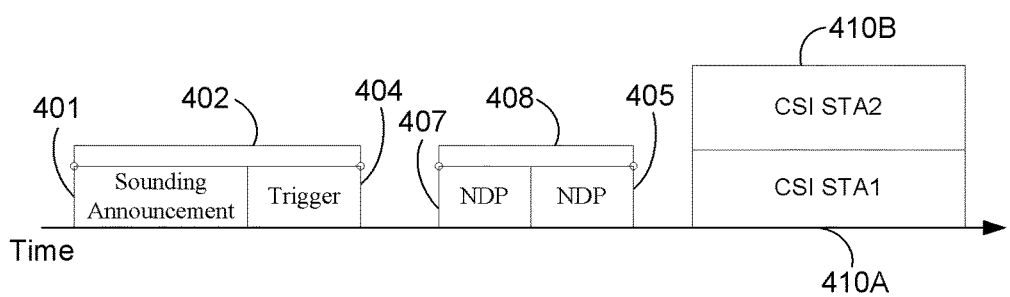
FIG. 5B shows a time diagram of another example frame exchange of CSI feedback.

FIG. 5B is a time sequence diagram illustrating another example of a frame exchange 500*b* of CSI feedback between an AP 110 and multiple wireless communication devices 120 similar to the frame exchange 500*a* of FIG. 5A. One difference between frame exchanges 500*a* and 500*b* is that sounding NDP 407 and sounding NDP 405 are illustrated together as part of packet 408 in FIG. 5B. In one embodiment, sounding NDP 407 and sounding NDP 405 are part of the same packet 408. In accordance with this embodiment, packet 408 may be a sounding NDP useable by a first set of devices with a first set of capabilities with long additional fields appended thereto and useable by a second set of devices with a second set of capabilities. In one embodiment, packet 408 is a VHT NDP with long training fields (LTFs) appended thereto, the LTFs useable by HE devices. In another embodiment, sounding NDP 405 is an HE NDP sent immediately after sounding NDP 407, which is a VHT NDP, and without any time in between.

In all of the embodiments described above with respect to FIGS. 4A-D and FIGS. 5A-B, the sounding announcement 401 may be contained in a MAC frame that is part of a PPDU. Alternatively, the sounding announcement 401 may be transmitted similar to the embodiments describe with respect to FIG. 6.

Figure 6:
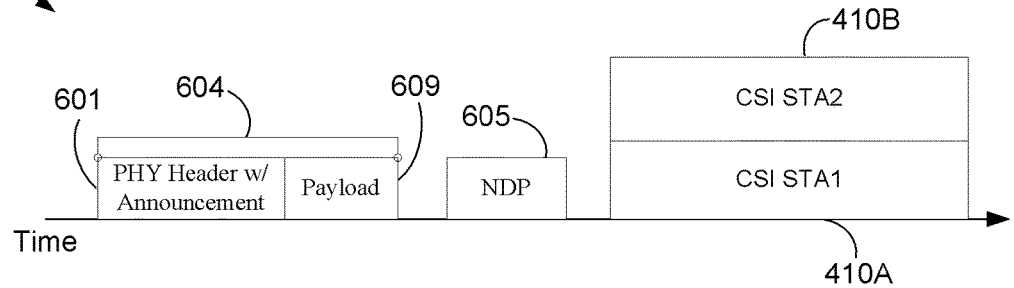
FIG. 6 shows a time diagram of another example frame exchange of CSI feedback.

FIG. 6 is a time sequence diagram illustrating another example of a frame exchange 600 of CSI feedback between an AP 110 and multiple wireless communication devices 120. Similar to the frame exchanges described above (400*a-d* and 500*a-b*), frame exchange 600 involves transmitting a sounding announcement 601 and a sounding NDP 605 to one or more wireless communication devices 120, and thereafter, receiving CSI information from the wireless communication devices in transmissions 410A and 410B.

However, in FIG. 6, the sounding announcement 601 is illustrated as being part of the header of packet 604. In some embodiments, packet 604 may also contain a payload 609, but in other embodiments, packet 604 is not formed with a payload 609. In one embodiment, the sounding announcement 601 may include the reference signaling for channel estimation, so that the sounding NDP 605 may not be sent. In accordance with this embodiment, the reference signaling may be a plurality of LTFs.

In one embodiment, packet 604 is a PPDU. In accordance with this embodiment, the sounding announcement 601 and allocation information (similar to trigger frame 404 described above) are contained in a physical layer frame of the PPDU. In some aspects, sounding announcement 601 indicates that sounding NDP 605 is an HE NDP or a VHT NDP, and whether wireless communication devices 120 receiving the sounding NDP 605 are to respond with CSI using HE sounding or VHT sounding, similar to the embodiments described above. In one embodiment, the physical layer frame containing the sounding announcement 601 and allocation information is the SIG-B field of an 802.11 PPDU. In other embodiments, one or more field of a PPDU may contain information common to all of the wireless communication devices 120 receiving the packet 604, and another field of the PPDU may contain parameters for each of the individual wireless communication devices 120. In one exemplary embodiment, a SIG-A or SIG-B field (or both) of an 802.11 PPDU may contain information common to all of the wireless communication devices 120 receiving the packet 604, and a SIG-C field of the 802.11 PPDU may contain parameters for each of the individual wireless communication devices 120.

All of the embodiments described above with respect to FIGS. 4A-D, FIGS. 5A-B, and FIG. 6, may be slightly altered so that the frame exchanges described in the figures may be scheduled to start at negotiated times for one or more of the wireless communication devices 120. In these altered frame exchanges, a sounding announcement (e.g., 401 or 601) may not be required, as all of the CSI parameters may be negotiated beforehand. Accordingly, the AP 110 may negotiate a sounding procedure with the one or more of the wireless communication devices 120 by indicating a time at which the sounding NDPs (e.g., 405, 407 or 605) will be sent. In one embodiment, the sounding NDPs include an identifier for the AP 110. In negotiating the sounding procedure, the AP 110 may also indicate the type of feedback or CSI requested, and may indicate a time at which multi-user beamforming report (MU BR) polls may be sent by the AP 110.

In this scheduled periodic sounding, the one or more of the wireless communication devices 120 may wake up at the indicated time to receive the sounding NDP (e.g., 405, 407, or 605) and estimate the channel from based upon the sounding NDP. In one embodiment, the wireless communication devices 120 may wait for an MU BR poll from the AP 110, which the AP 110 may send immediately after the NDP, or at a scheduled time. In another embodiment, the wireless communication devices 120 may be allowed to contend for sending single user CSI. In some embodiments, the BR poll may also indicate the type of feedback requested.

In some aspects, the sounding announcement 401 (as shown in FIGS. 4A-4D and FIGS. 5A-B) may be an NDPA carried in the payload of a 1× or 4×PPDU. The PPDU may be a single-user (SU) PPDU or MU (MIMO or OFDMA) PPDU and may include one or more MAC protocol data units (MPDUs), at least one of which is an NDPA MAC frame. In this embodiment, the aggregation discussed in relation to FIGS. 4B and 5B may be realized by aggregating the NDPA MAC frame in an aggregated MPDU (A-MPDU) with other MAC frames (e.g., a trigger frame). The NDPA MAC frame provides at least an identification of the STAs that are to estimate and report the CSI, the parameters for the format of the CSI (band, resolution, quantization), and may include parameters for the transmission of the CSI (UL-MU-MIMO/OFDMA resource allocation, MCS etc.).

Figure 7A:
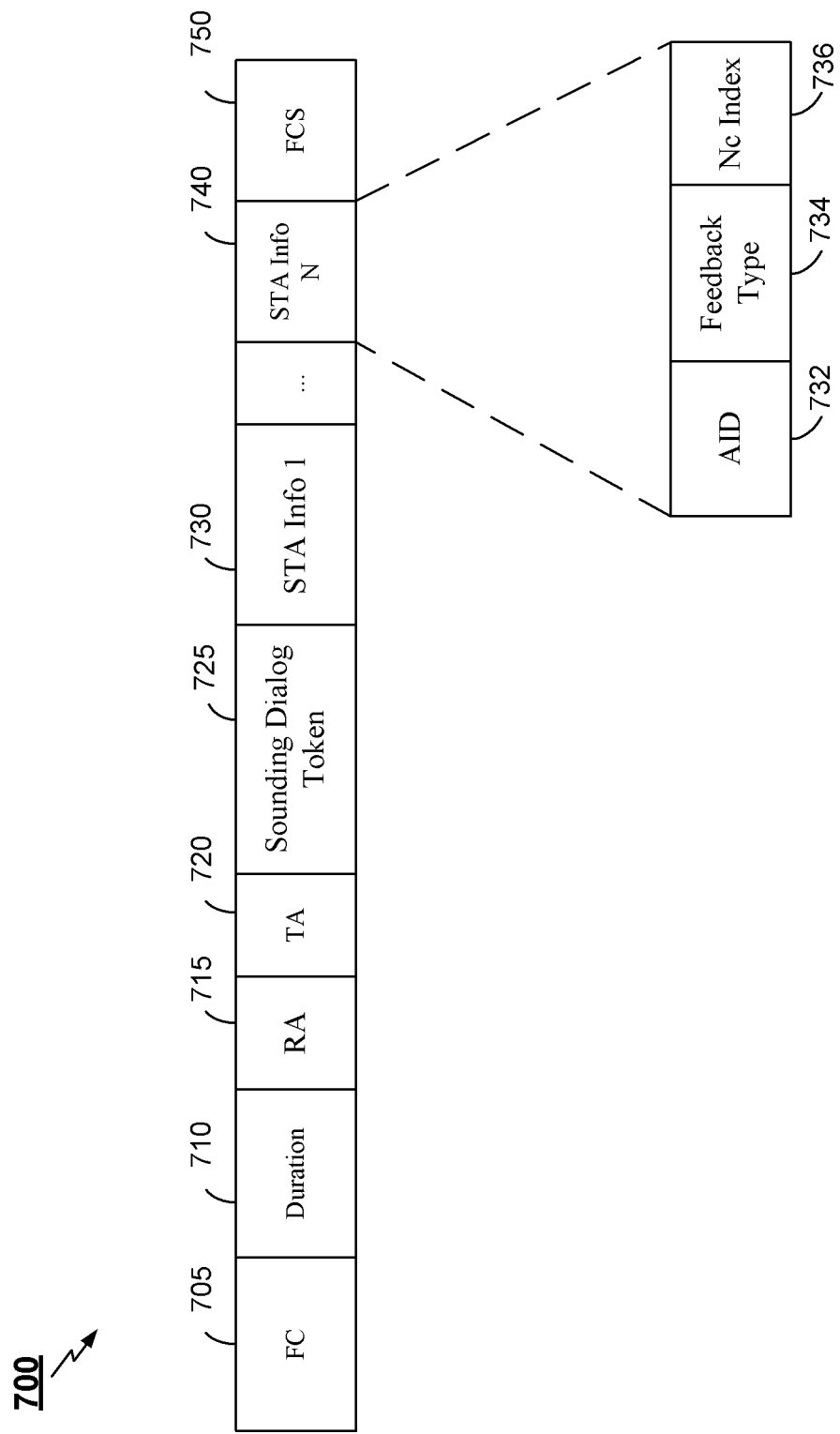
FIG. 7A shows a diagram of one embodiment of a null data packet announcement (NDPA) frame.

FIG. 7A is a diagram of an example format of a NDPA MAC frame 700. In this embodiment, the NDPA frame 700 includes a frame control (FC) field 705, a duration field 710, a receiver address (RA) field 715, a transmitter address (TA) field 720, sounding dialog token field 725, a per STA information (info) field 730, and a frame check sequence (FCS) field 750. The FC field 705 indicates a control subtype or an extension subtype. In the FC field 705, the protocol version, type, and subtype may be the same as defined for the NDP announcement frame defined by the 802.11ac standard. In this case, one or more bits in one of the FC field 705, duration field 710, TA field 720, RA field 715, or sounding dialog token field 725 may be used to indicate that the NDPA frame 700 has a modified format for its use as described in this application. Alternatively, a new type and new subtype may be used to indicate that the NDPA frame 700 has a specific format for the use as described in this application. In some aspects, two reserved bits in the sounding dialog token field 725 may be used to indicate whether the wireless communication devices 120 should send their responses to the NDPA frame 700 via UL-MU-MIMO transmissions, UL-OFDMA transmissions, or according to 802.11ac behavior (i.e. one STA sends CSI immediately and the other STAs wait to be polled).

The duration field 710 indicates to any receiver of the NDPA frame 700 to set the network allocation vector (NAV). The RA field 715 indicates the wireless communication devices 120 (or STAs) that are the intended recipients of the frame. The RA field 715 may be set to broadcast or to a multicast group that includes the STAs listed in the STA info fields 730-740. If the type or subtype are set to a new value, in an embodiment, the RA field 715 may be omitted, as the type/subtype implicitly indicates that the destination is broadcast. The TA field 720 indicates the transmitter address or a BSS identifier (BSSID). The sounding dialog token field 725 indicates the particular sounding announcement to the STAs.

In an embodiment where the NDPA frame 700 indicates response should be sent using UL-MU-MIMO, the STAs listed in the STA info fields 730-740 may respond by using UL-MU-MIMO. In this aspect, the stream ordering may follow the same ordering of STA info fields 730-740. Additionally, the number of streams to be allocated and the power offsets for each of the STAs may be pre-negotiated. In another aspect, the number of streams allocated per STA may be based on the number of streams sounded by the sounding NDP. For example, the number of streams per STA may be equal to the number of sounded streams divided by the maximum number of streams available for all STAs listed.

In an embodiment where the NDPA frame 700 indicates response should be sent using UL-OFDMA, the STAs listed in the STA info fields 730-740 may respond by using UL-OFDMA. In this aspect, the channel ordering may follow the same ordering of STA info fields 730-740. Additionally, the number of channels to be allocated and the power offsets for each of the STAs may be pre-negotiated.

In another aspect, the number of channels allocated per STA may be based on the number of channels sounded by the sounding NDP.

The STA info field 730 contains information regarding a particular STA and may include a per-STA (per wireless communication device 120) set of information (see STA info 1 730 and STA info N 740). The STA info field 730 may include an allocation identifier (AID) field 732 which identifies a STA, a feedback type field 734, and an Nc index field 736. The FCS field 750 carries an FCS value used for error detection of the NDPA frame 700. In some aspects, the NDPA frame 700 may also include a PPDU duration field (not shown). The PPDU duration field indicates the duration of the following UL-MU-MIMO (or UL-OFDMA) PPDU that the wireless communication devices 120 are allowed to send. In other aspects, the PPDU duration may be agreed to beforehand between an AP 110 and the wireless communication devices 120. In some embodiments, the PPDU duration field may not be included if the duration field 710 is used to compute the duration of the response that the wireless communication devices 120 are allowed to send.

Figure 7B:
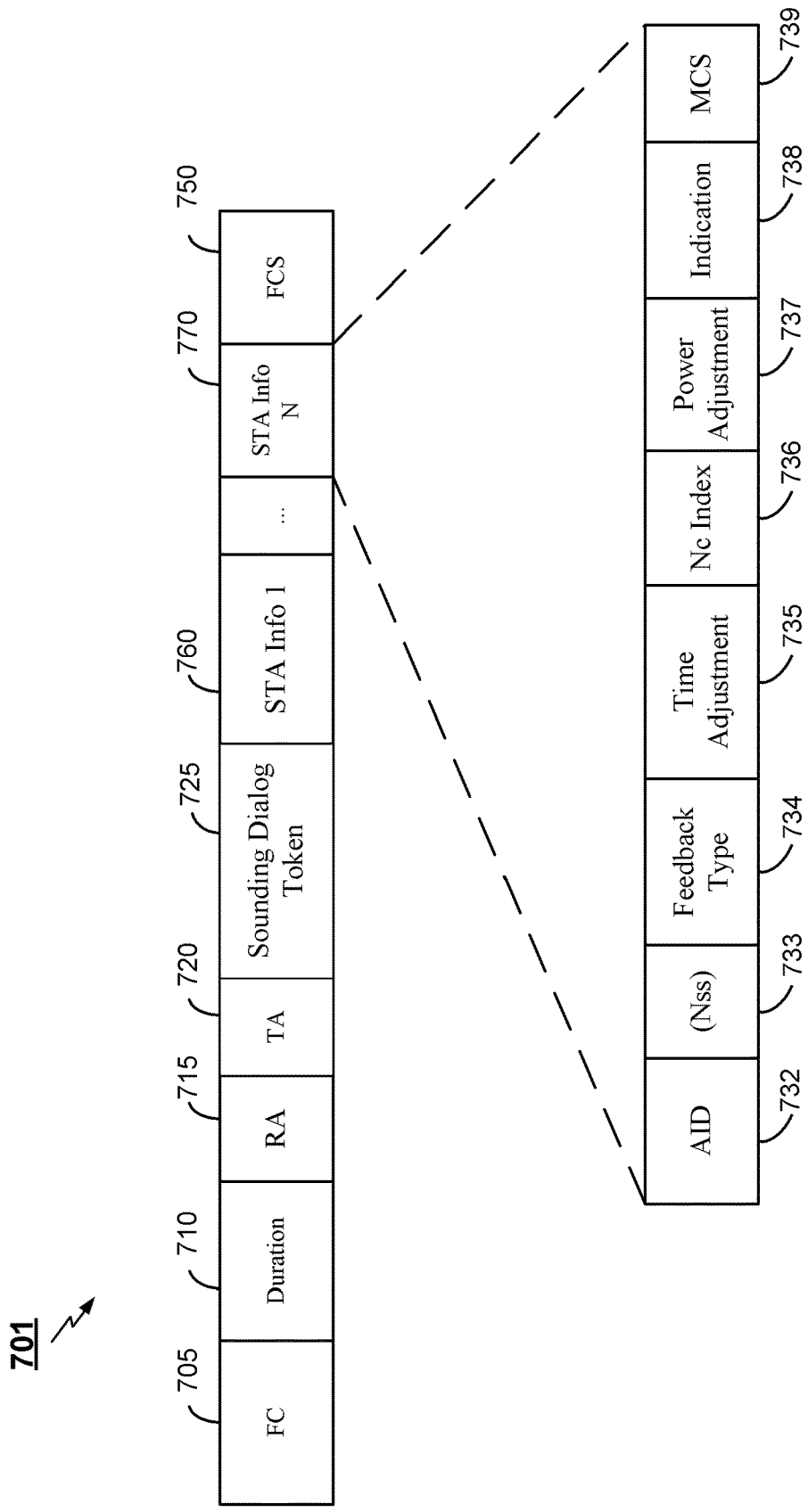
FIG. 7B shows a diagram of another embodiment of an NDPA frame.

In some aspects, a sounding announcement may comprise a modified null data packet announcement (NDPA) frame. FIG. 7B is a diagram of an example format of a modified MAC NDPA frame 701. In this embodiment, the NDPA frame 701 contains the same fields as the NDPA frame 700 except the STA info fields 730-740 are extended by one or two bytes to include new fields. In this embodiment, STA info fields 760-770 may include a number of spatial streams field (Nss) field 733 which indicates the number of spatial streams a STA may use (in an UL-MU-MIMO system), a time adjustment field 735 which indicates a time that a STA should adjust its transmission compared to the reception of a trigger frame, a power adjustment field 737 which indicates a power backoff a STA should take from a declared transmit power, an indication field 738 which indicates the allowed transmission modes, and a MCS field 739 which indicates the MCS the STA should use or the backoff the STA should use. The STA info field 760 may include a 1 bit indication of whether the STA may respond immediately or wait to be polled later. In another aspect the NDPA frame 700 or 701 may include a field indicating that a certain number of STAs should respond immediately and the remaining STA should wait to be polled later.

In some aspects, the NDPA frame 700 may also include a PPDU duration field (not shown). The PPDU duration field indicates the duration of the following UL-MU-MIMO PPDU that the wireless communication devices 120 are allowed to send. In other aspects, the PPDU duration may be agreed to beforehand between an AP 110 and the wireless communication devices 120. In some embodiments, the PPDU duration field may not be included if the duration field 710 carries a value that allows computation of the duration of the response that the wireless communication devices 120 are allowed to send.

Figure 8:
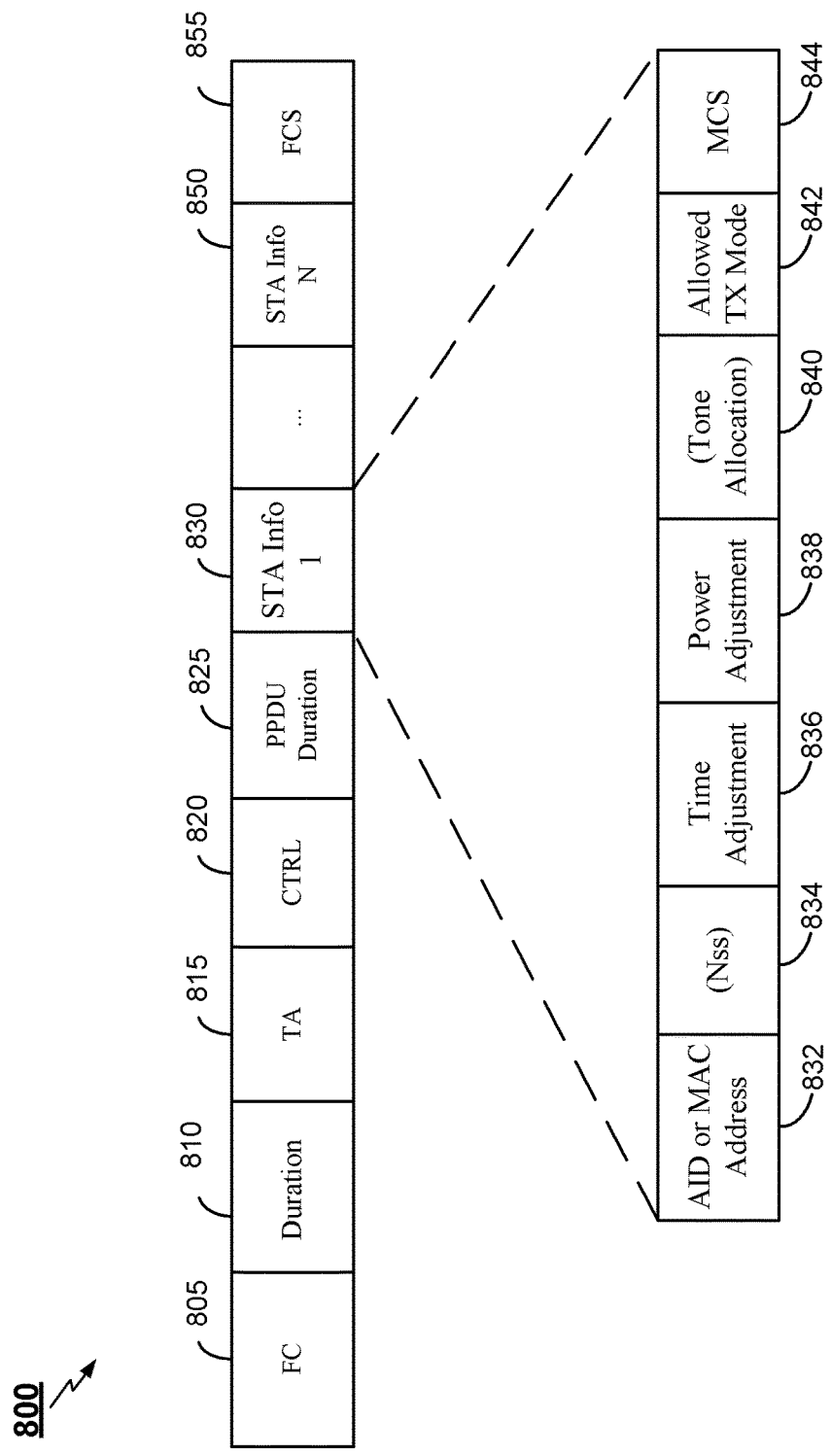
FIG. 8 shows a diagram of one embodiment of a clear to transmit (CTX) frame.

In some aspects, a PPDU comprising the sounding announcement may further comprise a clear to transmit (CTX) frame. FIG. 8 is a diagram of an example format of a CTX frame 800. In some embodiments, the CTX frame 800 may comprise a MAC NDPA frame. In this embodiment, the CTX frame 800 includes a frame control (FC) field 805, a duration field 810, a transmitter address (TA) field 815, a control (CTRL) field 820, a PPDU duration field 825, a STA info field 830, and a frame check sequence (FCS) field 855. The FC field 805 indicates a control subtype or an extension subtype. The duration field 810 indicates to any receiver of the CTX frame 800 to set the network allocation vector (NAV). The TA field 815 indicates the transmitter address or a BSSID. The CTRL field 820 is a generic field that may include information regarding the format of the remaining portion of the frame (e.g., the number of STA info fields and the presence or absence of any subfields within a STA info field), indications for rate adaptation for the wireless communication devices 120 (e.g., a number indicating how the STA should lower their MCSes, compared to the MCS the STA would have used in a single-user (SU) transmission or a number indicating the signal-to-interference-plus-noise ratio (SINR) loss that the STA should account for when computing the MCS in the UL transmission opportunity (TXOP), compared to the MCS computation in the SU transmission), indication of allowed TID, and indication that a clear to send (CTS) message must be sent immediately following the CTX frame 800. The CTRL field 820 may also indicate if the CTX frame 800 is being used for UL-MU-MIMO or for UL-OFDMA or both, indicating whether an Nss or tone allocation field is present in the STA Info field 830. Alternatively, the indication of whether the CTX is for UL-MU-MIMO or for UL-OFDMA can be based on the value of the subtype. In some aspects, the UL-MU-MIMO and UL-OFDMA operations can be jointly performed by specifying to a STA both the spatial streams to be used and the channel to be used, in which case both fields are present in the CTX; in this case, the Nss indication is referred to a specific tone allocation. The PPDU duration field 825 indicates the duration of the following UL-MU-MIMO PPDU that the wireless communication devices 120 are allowed to send. The STA info field 830 contains information regarding a particular STA and may include a per-STA (per wireless communication device 120) set of information (see STA Info 1 830 and STA Info N 850). The STA info field 830 may include an AID or MAC address field 832 which identifies a STA, a number of spatial streams field (Nss) 834 field which indicates the number of spatial streams a STA may use (in an UL-MU-MIMO system), a time adjustment field 836 which indicates a time that a STA should adjust its transmission compared to the reception of a trigger frame (the CTX in this case), a power adjustment field 838 which indicates a power backoff a STA should take from a declared transmit power, a tone allocation field 840 which indicates the tones or frequencies a STA may use (in a UL-OFDMA system), an allowed transmission (TX) mode field 842 which indicates the allowed transmission modes, and a MCS 844 field which indicates the MCS the STA should use. The FCS field 855 carries an FCS value used for error detection of the CTX frame 800.

In some embodiments, the PPDU duration field 825 may be omitted from the CTX frame 800 frame if the duration field 810 carries a value that allows computation of the duration of the response that the wireless communication devices 120 are allowed to send. In other embodiments, the CTX frame 800 may include a sounding sequence number or a token number which STAs may use in their responses to indicate to the AP 110 that its messages are in response to the same CTX frame 800. In some aspects, the STA info field 830 may include a 1 bit indication of whether the STA may respond immediately or wait to be polled later. In some embodiments, the FC field 805 or the CTRL field 820 may indicate that the CTX frame 800 is a sounding announcement CTX frame (i.e. the CTX is followed by a sounding frame (NDP) and requests responses from multiple STAs).

In another embodiment, the sounding announcement portion of a PPDU (e.g., sounding announcement 401) may carry the announcement information in one or more of the SIG field(s) in the PHY header. In one example the PPDU may not carry a MAC payload. In another example the PPDU may include a MAC payload with data, control or management information.

In one example, the sounding announcement 401 may be in the MAC portion of an 802.11ax PPDU with a high-efficiency (HE) SIG-B field comprising at least an identification of the transmitter AP, an identification of the STAs that are supposed to compute the CSI, identification of the STAs that are supposed to respond with UL-MU-MIMO/OFDMA CSI and the corresponding transmission parameters.

In another example, the sounding announcement is carried only in the PHY header of a PPDU, and comprises the UL resource allocation information, instructing the STA on the transmission parameters for sending the response UL-MU-MIMO/OFDMA PPDU, but does not include sounding announcement information in the PHY header. The sounding announcement information may instead be carried by a NDPA MAC frame in the payload. Hence, the combination of the signaling in the PHY header and in the MAC payload conveys all the necessary signaling for the STAs to compute and report the CSI, in a frame exchange as shown in FIG. 4A-D, 5A-B or 6.

Figure 9:
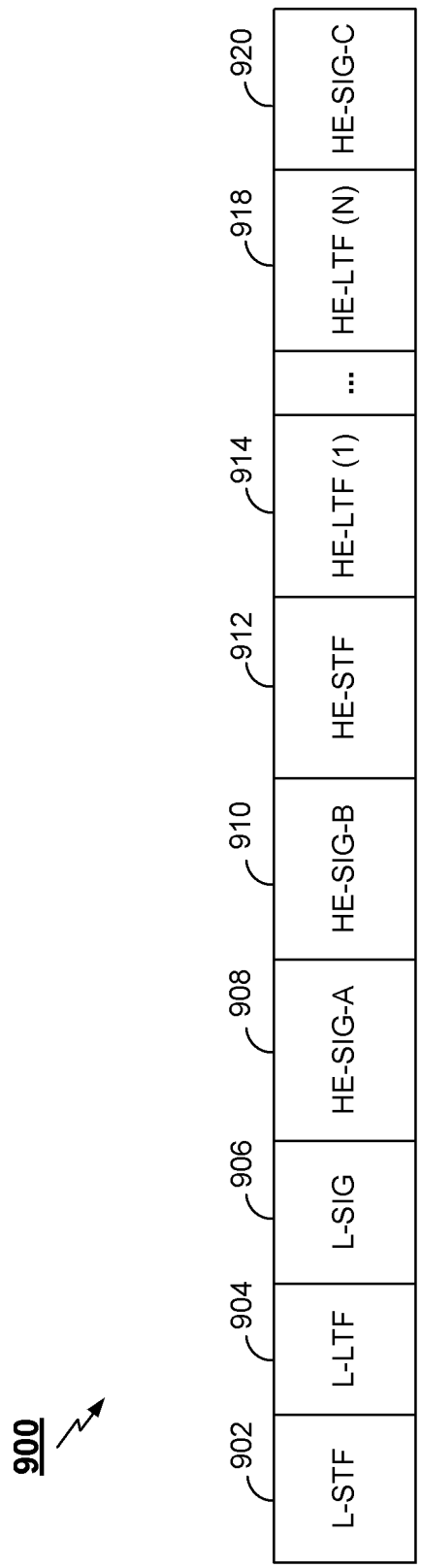
FIG. 9 shows a diagram of one embodiment of a null data packet (NDP) frame.

In some aspects, a sounding NDP may comprise a HE NDP frame. FIG. 9 is a diagram of an example of a NDP structure. In the illustrated embodiment, the physical-layer packet/frame 900 includes an L-STF 902, L-LTF 904, an L-SIG 906, the HE-SIG-A 908, an HE-SIG-B 910, and HE-STF 912, HE-LTFs 914-918, and HE-SIG-C 920. A person having ordinary skill in the art will appreciate that the illustrated physical-layer packet/frame 900 can include additional fields, fields can be rearranged, removed, and/or resized, and the contents of the fields varied. For example, the HE-SIG-C 920 can be omitted in some embodiments.

In accordance with the embodiments described above, HE-SIG-A 908 or HE-SIG-B 910 may include an indication that the frame 900 is an NDP. Additionally or alternatively, HE-LTFs 914-918 may be used by STAs to calculate CSI requested by an AP.

Figure 10:
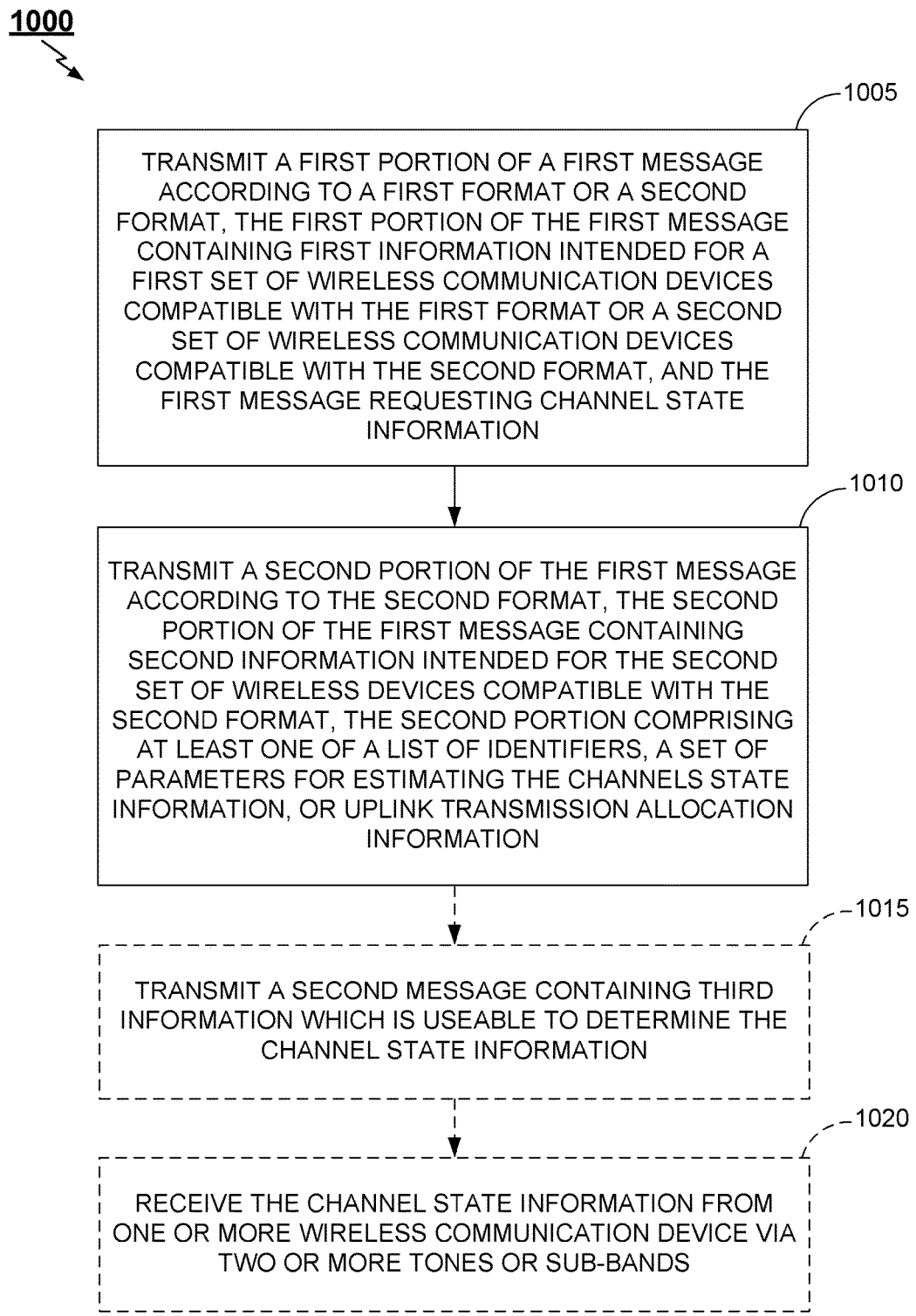
FIG. 10 is a flow chart of an aspect of an exemplary method of wireless communication.

FIG. 10 is a flow chart of an exemplary method 1000 for wireless communication in accordance with certain embodiments described herein. In some embodiments method 1000 may be performed by an apparatus for wireless communication, such as the AP 110 of FIG. 1 or the wireless communication device 302 of FIG. 3. However, a person having ordinary skill in the art will appreciate that the method 1000 may be implemented by other suitable devices and systems.

At operation block 1005, the wireless communication device 302, for example, transmits a first portion of a first message according to a first format or a second format. The first portion of the first message contains first information intended for a first set of wireless communication devices compatible with the first format or a second set of wireless communication devices compatible with the second format. The first message requests channel state information (e.g., from one or more wireless communication devices). In some aspects, the first portion of the first message is transmitted to one or more of the wireless communication devices 120 of FIG. 1. In some aspects, the first format is a very-high-throughput (VHT) format. In certain aspects, the second format is a high-efficiency (HE) format.

At operational block 1010, the wireless communication device 302, for example, transmits a second portion of the first message according to the second format. The second portion of the first message contains second information intended for the second set of wireless communication devices compatible with the second. As illustrated, the second portion of the message comprises at least one of a list of identifiers (e.g., for one or more wireless communication devices from which channel state information is requested), a set of parameters for estimating the channel state information, and/or uplink transmission allocation information (e.g., for the one or more wireless communication devices from which channel state information is requested). In various aspects, the first message is a sounding announcement contained in a PPDU, and in some aspects the first message is an HE NDPA. In some embodiments, the first message is contained in a header of a physical layer convergence protocol data unit (PPDU). A payload of the PPDU can comprise data for the one or more wireless communication devices from which channel state information is requested. In other embodiments, the PPDU may comprise a PHY header comprising the first message, sent without a payload. In some embodiments, the first message is contained in a payload of a physical layer convergence protocol data unit (PPDU).

In some aspects, the second portion of the first message further comprises an indication of a tone or sub-band for which the channel state information is requested. As a non-limiting example, requesting CSI of a sub-band rather than an entire bandwidth may provide more accurate estimation of the CSI. In some aspects, at least a portion of the first message is transmitted on the tone or sub-band for which the channel state information is requested, and in other aspects, the tone or sub-band for which the channel state information is requested is specifically identified in the first message. In an embodiment, the tone or sub-band for which the channel state information is requested is the same as the tone or sub-band allocated to one or more wireless communication devices for uplink transmission.

In some aspects, the first message (e.g., the second portion) may further comprise at least one of a first indication that a sounding frame will be transmitted after transmission of the first message, a second indication that multi-user sounding is requested, or an allocation identifier (AID) corresponding to a reserved field. As a non-limiting example, one advantage of this additional data is that it may be used to prevent wireless communication devices from immediately transmitting single user CSI in accordance with a legacy or VHT format. In some aspects, the first message may additionally or alternatively comprise data for the one or more wireless communication devices from which channel state information is requested or management information. As a non-limiting example, this format may enable an AP and multiple STAs to cut down on the overall time required to send data/ACKs and CSI requests/responses between the entities.

At optional operational block 1015 the wireless communication device 302, for example, transmits (e.g., to one or more wireless communication device) a second message containing third information which is useable (e.g., by the one or more wireless communication devices) to determine the channel state information. In various aspects, the first message is a sounding frame announcement message and the second message is a sounding frame (e.g., an NDP). In certain aspects, the second message further comprises a first indication that the sounding frame is intended for the second set of wireless communication devices, and/or a second indication that multi-user channel state information is requested. In an embodiment the third information comprises a plurality of long training fields useable to determine the channel state information. In some aspects the sounding frame announcement message is a high-efficiency null data packet announcement (HE-NDPA) and the sounding frame is a high-efficiency null data packet (HE-NDP). In some aspects, the second message comprises a plurality of long training fields which are used to determine the requested channel state information. In various aspects, the second message is transmitted a short interframe space (SIFS) after the first message. In some aspects, operational block 1015 is not part of method 1000.

At optional operational block 1020 (indicated by dashed lines), the wireless communication device 302, for example, receives the channel state information (e.g., from the one or more wireless communication devices from which channel state information is requested) via two or more tones or sub-bands. In various aspects, the channel state information is received in an uplink multi-user physical layer convergence protocol data unit (UL-MU-PPDU). In an embodiment, the UL-MU-PPDU further comprises a block acknowledgment of information previously transmitted to the one or more wireless communication devices from which channel state information is requested. In some embodiments, the channel state information (e.g., UL-MU-PPDU) is received in accordance with a multiple-input multiple-output (MIMO) protocol or a frequency division multiple access (FDMA) protocol. As a non-limiting example, simultaneously transmitting MU CSI information on multiple tones or sub-bands may save on the overall transmission time required for all STAs to provide CSI to an AP. In some aspects, the UL transmission may further comprise block acknowledgment of information previously transmitted to the one or more wireless communication devices from which channel state information is requested. In some aspects, operational block 1020 is not part of method 1000.

In some aspects, method 1000 may additionally or alternatively comprise transmitting, by the wireless communication device 302 to one or more other wireless communication device 302, for example, a second message containing third information which may be used to determine the channel state information. Method 1000 may additionally or alternatively comprise receiving, by the wireless communication device 302, for example, the channel state information from a first wireless communication device. Method 1000 may additionally or alternatively comprise transmitting, by the wireless communication device 302, for example, after receiving the channel state information, a beamforming report poll frame to trigger a second wireless communication device to transmit the channel state information. Further, method 1000 may additionally or alternatively comprise receiving, by the wireless communication device 302, for example, the channel state information from the second wireless communication device.

Figure 11A:
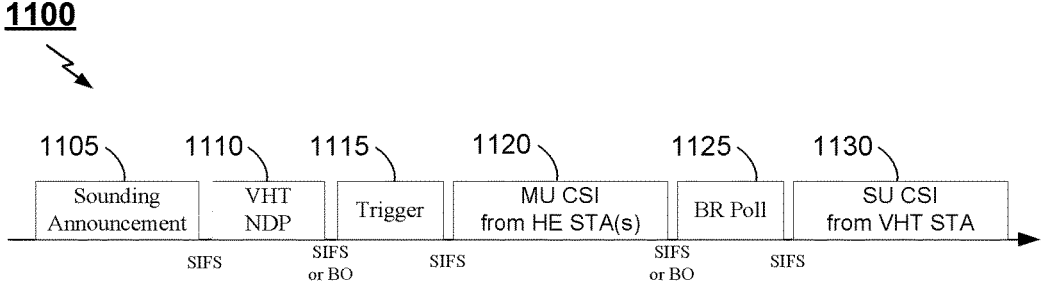
FIG. 11A illustrates an exemplary channel sounding sequence, in accordance with an embodiment.

FIG. 11A illustrates an exemplary channel sounding sequence 1100, in accordance with an embodiment. In some aspects, the channel sounding sequence 1100 may be utilized to obtain channel sounding information from one or more VHT or HE wireless devices. These VHT or HE wireless devices may be similar to the wireless communication device 302 of FIG. 3. In some aspects, an HE device may be able to communicate in accordance with a VHT protocol, but a VHT device may not be able to communicate in accordance with an HE protocol. Thus, channel sounding sequence 1100 may be utilized to communicate with both types of devices.

As illustrated, channel sounding sequence 1100 may comprise the transmission of a sounding announcement 1105. The sounding announcement 1105 may be transmitted by an AP 110 to one or more UTs 120 (illustrated as "STA(s)"). In some aspects, the sounding announcement 1105 may be an NDPA transmitted in accordance with the format 700 of FIG. 7A, format 701 of FIG. 7B, or format 1300 of FIG. 13. After transmitting the sounding announcement 1105, the AP 110 may transmit a VHT NDP 1110. In an embodiment, the VHT NDP 1110 may be transmitted a SIFS after the transmission of the sounding announcement 1105. As discussed above, the VHT NDP 1110 frame can provide a reference signal that allows STAs to estimate the channel between the one or more antennas of the transmitter and the one or more antennas of the UT and may be an 802.11ax NDP frame, an 802.11ac NDP frame, an 802.11n NDP frame, an 802.11ah NDP frame, or other 802.11 based NDP frame. In various aspects, the VHT NDP 1110 may comprise the NDP frame format 900 discussed above with respect to FIG. 9. In some aspects, when an HE or a VHT device receives a VHT NDP 1110, CSI (or other feedback) may be computed according to a VHT specification.

After transmitting the VHT NDP 1110, the AP 110 may transmit a trigger frame 1115. In an embodiment, the trigger frame 1115 may be transmitted a SIFS or a back-off (BO) period after the transmission of the VHT NDP 1110. In some aspects, the trigger frame may be transmitted in accordance with the format 800 of FIG. 8 or the format 1400 of FIG. 14. In various aspects, the trigger frame 1115 may indicate which UTs 120 are to participate in the channel sounding sequence 1100, such that a particular UT 120 knows to start a transmission. For example, as illustrated, one or more UT 120 may transmit MU CSI 1120. In an embodiment, the MU CSI 1120 may be transmitted a SIFS after the transmission of the trigger frame 1115. In various aspects, the MU CSI 1120 may contain the requested CSI, as determined by one or more of the UTs 120 transmitting the information.

After the transmission of the MU CSI 1120, the AP 110 may transmit a beamforming report (BR) poll 1125. In an embodiment, the BR poll 1125 may be transmitted a SIFS or BO after the transmission of the MU CSI 1120. In an embodiment, the BR poll 1125 may be similar to the BR poll frame for VHT devices as defined in 802.11ac. In some aspects, the BR poll may be transmitted to allow a single VHT UT 120 to provide the AP 110 with CSI. For example, as illustrated, SU CSI 1130 may be transmitted by a VHT UT 120 a SIFS after the transmission of the BR poll 1125. In various aspects, the SU CSI 1130 may contain the requested CSI, as determined by the UTs 120 transmitting the information. As part of the channel sounding sequence 1100, the AP 110 may continue to transmit trigger frames 1115 or BR polls 1125 until it receives all of the requested CSI information. In an aspect, the requested CSI information may refer to the CSI requested via the sounding announcement 1105. In an embodiment, all (or at least a portion of) the requested CSI may be determined based at least in part upon the VHT NDP 1110. In some aspects, the parameters used by the UTs 120 to transmit the CSI to the AP 110 may be based upon information received in one or more of the sounding announcement 1105, the trigger frame 1115, or the BR poll 1125. In an aspect, CSI may be transmitted consistent with the 802.11ac specification.

Figure 11B:
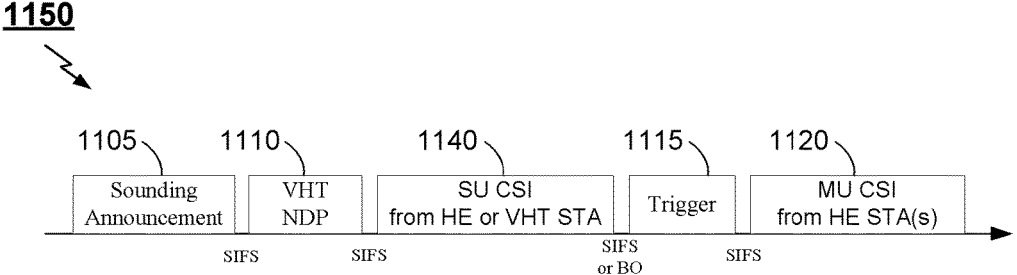
FIG. 11B illustrates an exemplary channel sounding sequence, in accordance with an embodiment.

FIG. 11B illustrates an exemplary channel sounding sequence 1150, in accordance with an embodiment. The channel sounding sequence 1150 may be similar to the channel sounding sequence 1100 of FIG. 11A, as it may request CSI from VHT and HE UTs 120. However, as illustrated, an initial trigger frame 1115 may not be sent before the first transmission of CSI. This can occur because the sounding announcement 1105 may indicate that the UTs 120 are to transmit CSI immediately (e.g., a SIFS) after the end of the transmission of a VHT NDP 1110. For example, as illustrated, SU CSI 1140 may be transmitted by a UT 120 after the transmission of the VHT NDP 1110. In an aspect, the SU CSI 1140 may be transmitted in response to information provided in the sounding announcement 1105 indicating that the UT 120 is to reply with CSI immediately. After the SU CSI 1140 is transmitted, the AP 110 may continue to transmit trigger frames 1115 or BR polls 1125 (not illustrated) and UTs may continue to transmit CSI (e.g., illustrated MU CSI 1120) until all requested CSI is received. In an embodiment, once all requested CSI is requested, the AP 110 may conduct another channel sounding sequence (e.g., channel sounding sequence 1100 or 1150).

Figure 12A:
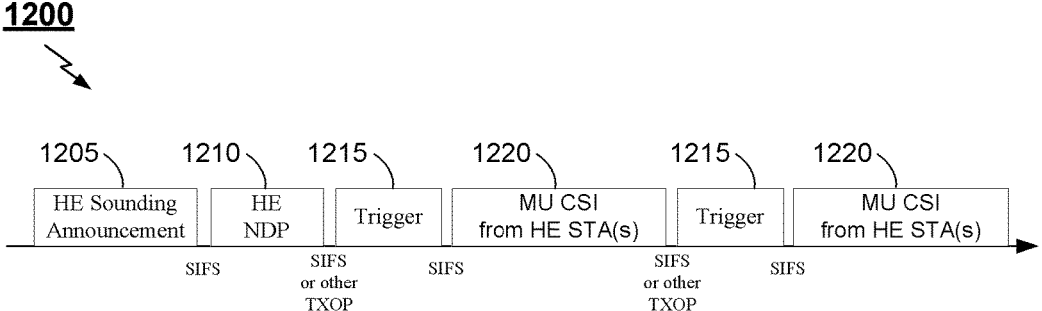
FIG. 12A illustrates an exemplary channel sounding sequence, in accordance with an embodiment.

FIG. 12A illustrates an exemplary channel sounding sequence 1200, in accordance with an embodiment. In some aspects, the channel sounding sequence 1200 may be utilized to obtain channel sounding information from one or more HE wireless devices. These HE wireless devices may be similar to the wireless communication device 302 of FIG. 3.

As illustrated, channel sounding sequence 1200 may comprise the transmission of an HE sounding announcement 1205. The HE sounding announcement 1205 may be transmitted by an AP 110 to one or more UTs 120 (illustrated as "STA(s)"). In some aspects, the HE sounding announcement 1205 may be an NDPA transmitted in accordance with the format 700 of FIG. 7A, format 701 of FIG. 7B, or format 1300 of FIG. 13. After transmitting the HE sounding announcement 1205, the AP 110 may transmit an HE NDP 1210. In an embodiment, the HE NDP 1210 may be transmitted a SIFS after the transmission of the sounding announcement 1205. As noted above, the HE NDP 1210 frame can provide a reference signal that allows UTs 120 to estimate the channel between the one or more antennas of the transmitter and the one or more antennas of the UT 120 and may take various formats. In some aspects, when an HE device receives the HE NDP 1210, CSI (or other feedback) may be computed according to an HE specification.

After transmitting the HE NDP 1210, the AP 110 may transmit a trigger frame 1215. In an embodiment, the trigger frame 1215 may be transmitted a SIFS after or in another TXOP after the transmission of the HE NDP 1210. In some aspects, the trigger frame 1215 may be transmitted in accordance with the format 800 of FIG. 8 or the format 1400 of FIG. 14. In various aspects, the trigger frame 1215 may indicate which UTs 120 are to participate in the channel sounding sequence 1200, such that a particular UT 120 knows to start a transmission. For example, as illustrated, one or more HE UTs 120 may transmit MU CSI 1220. In an embodiment, the MU CSI 1220 may be transmitted a SIFS after the transmission of the trigger frame 1215. In various aspects, the MU CSI 1220 may contain the requested CSI, as determined by one or more of the UTs 120 transmitting the information.

After the transmission of the MU CSI 1220, the AP 110 may transmit another trigger frame 1215, and one or more of the UTs 120 may reply with MU CSI 1220 a SIFS after the transmission of the trigger frame 1215. In an embodiment, SU CSI may be transmitted instead. As part of the channel sounding sequence 1200, the AP 110 may continue to transmit trigger frames 1215 until it receives all of the requested CSI information. In an aspect, the requested CSI information may refer to the CSI requested via the sounding announcement 1205. In an embodiment, all (or at least a portion of) the requested CSI may be determined based at least in part upon the HE NDP 1210. In some aspects, the parameters used by the UTs 120 to transmit the CSI to the AP 110 may be based upon information received in the sounding announcement 1205, the trigger frame 1215, or both.

Figure 12B:
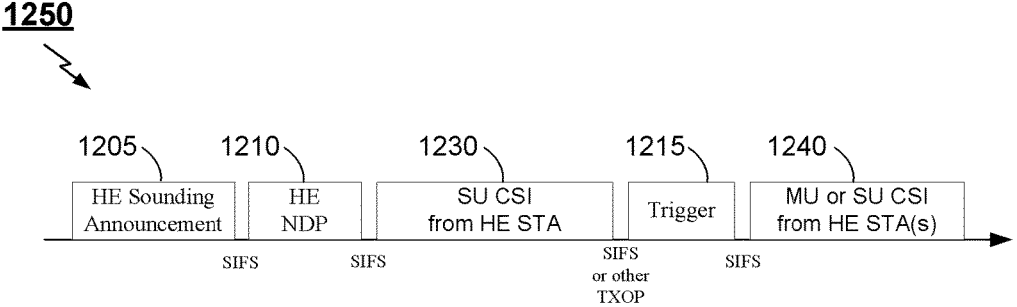
FIG. 12B illustrates an exemplary channel sounding sequence, in accordance with an embodiment.

FIG. 12B illustrates an exemplary channel sounding sequence 1250, in accordance with an embodiment. The channel sounding sequence 1250 may be similar to the channel sounding sequence 1200 of FIG. 12A, as it may request CSI from only HE UTs 120. However, as illustrated, an initial trigger frame 1215 may not be sent before the first transmission of CSI. This can occur because the sounding announcement 1205 may indicate that the UTs 120 are to transmit CSI immediately (e.g., a SIFS) after the end of the transmission of an HE NDP 1210. For example, as illustrated, SU CSI 1230 may be transmitted by a UT 120 after the transmission of the HE NDP 1210. In an aspect, the SU CSI 1230 may be transmitted in response to information provided in the sounding announcement 1205 indicating that the UT 120 is to reply with CSI immediately. After the SU CSI 1230 is transmitted, the AP 110 may continue to transmit trigger frames 1215 and UTs may continue to transmit MU or SU CSI 1240 until all requested CSI is received. When SU CSI is requested, the trigger frame 1215 may indicate that CSI is only requested for one UT 120. In an embodiment, once all requested CSI is requested, the AP 110 may conduct another channel sounding sequence (e.g., channel sounding sequence 1200 or 1250). In an embodiment, the AP 110 may be configured to transmit a BR poll (not illustrated) to obtain SU CSI from an HE UT 120, which may be similar to the BR poll 1125 of FIG. 11A. In some aspects, an AP 110 may be configured to perform some combination of the channel sounding sequence 1100, 1150, 1200, or 1250.

Figure 13:
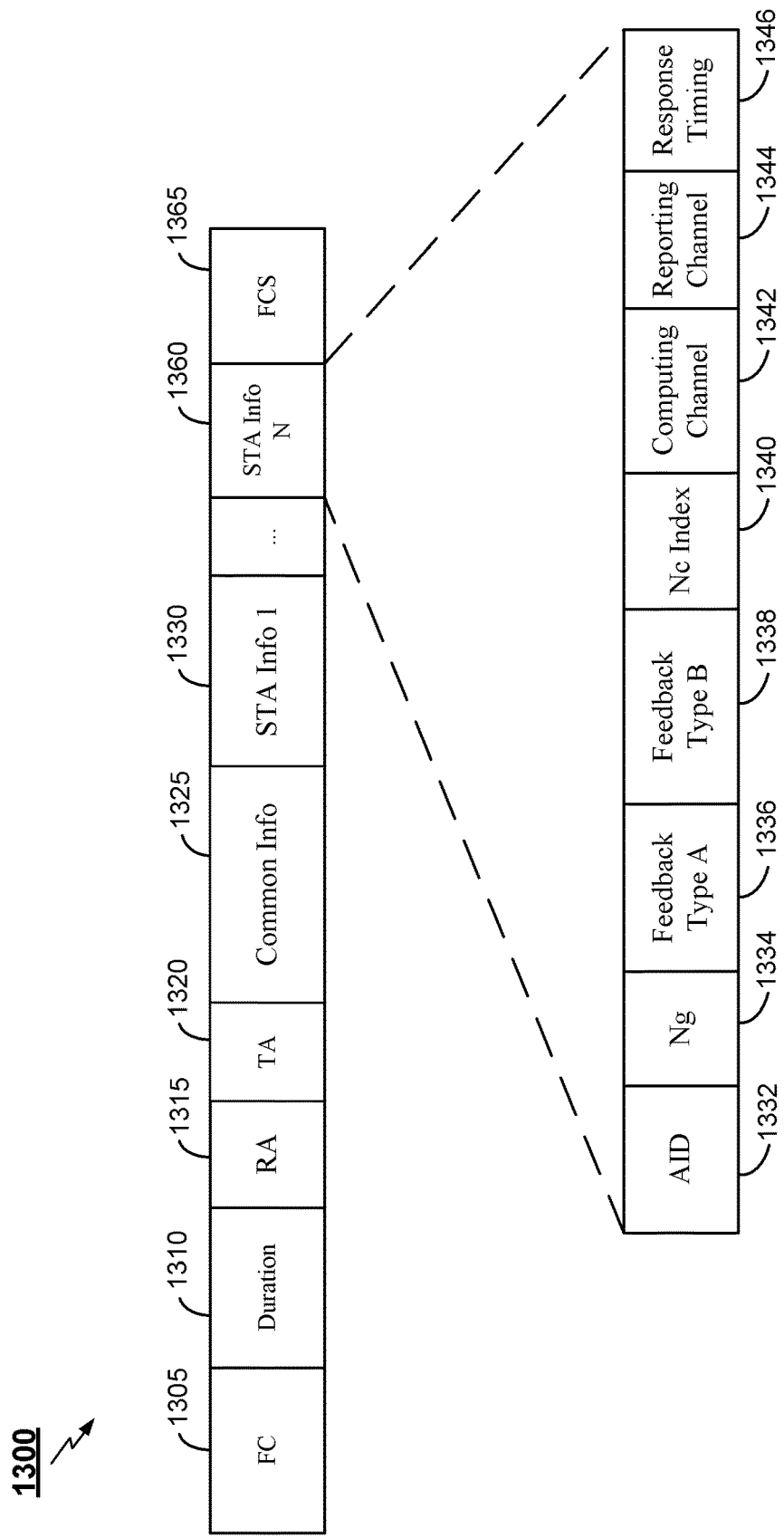
FIG. 13 is a diagram of an example of an HE NDPA frame format, in accordance with an embodiment.

FIG. 13 is a diagram of an example of an HE NDPA frame format 1300, in accordance with an embodiment. As illustrated, the HE NDPA 1300 may comprise a FC field 1305, a duration field 1310, an RA field 1315, a TA field 1320, a common info field 1325, STA information fields 1330-1360, and an FCS field 1365. Unless otherwise described, these fields of the HE NDPA 1300 may be similar to the corresponding fields of the NDPA frame 700 of FIG. 7A or the NDPA frame 701 of FIG. 7B. In some aspects, each STA information field 1330-1360 may comprise an AID field 1332, an Ng field 1334, a feedback type A field 1336, a feedback type B field 1338, an Nc index field 1340, a computing channel field 1342, a reporting channel field 1344, and a response timing field 1346.

The AID field 1332 may be utilized to indicate which STA the information of the particular STA information field 1330-1360 belongs to. In various aspects, the AID field 1332 may be twelve bits in length. As noted above, the HE NDPA 1300 may be utilized to transmit to both HE and VHT devices. In some aspects, a VHT device may expect that a valid AID will always comprise a "0" in the twelfth bit of the AID field 1332 (e.g., the bit indexed as bit 11). Accordingly, in an embodiment the twelfth bit may be set to "1" to indicate that the AID corresponds to an HE device, as a VHT device may not properly decode an AID transmitted in this manner. In some aspects, a VHT device may expect that each STA information field 1330-1360 is only two bytes in length. However, an HE device may be capable of receiving information in a STA information field 1330-1360 that is longer than two bytes. Accordingly, to avoid confusion when transmitting to both HE and VHT devices, all information fields for HE devices may be placed behind the information fields for VHT devices. Alternatively, all of the information fields for the VHT devices may be placed behind that of the HE devices.

The Ng field 1334 may indicate the quality of the channel feedback in terms of number of tones for which the feedback (e.g., CSI) is sent back. The Ng field 1334 values may be defined similar to an 802.11 standard, such as 802.11ac. In some aspects, additional or alternative values may be utilized. In some aspects, the Ng field 1334 value may indicate a minimum or a maximum value, and a STA receiving the information may be allowed to use a number of tones that fall within the indicated range. The feedback type A field 1336 may indicate whether the feedback should be formatted in accordance with an SU or MU transmission format. The feedback type B field 1338 may indicate whether the feedback should comprise CSI (e.g., quantization of phase and amplitude over frequency) or Channel Quality Information (CQI) (e.g., a coarse indication of channel amplitude over frequency). The Nc index field 1340 may indicate a number of spatial streams for which feedback is requested.

The computing channel field 1342 may indicate the portion of the channel that the STA should compute feedback for. In some aspects, the AP may request information for the entire portion of the channel for which the feedback was computed, or only a subset thereof. Accordingly, the reporting channel field 1344 may comprise an indication of the portion of the channel that the STA should report the feedback for. The response timing field 1346 may comprise an indication of whether the STA should transmit the feedback immediately, or whether to delay. For example, a STA may be requested to immediately transmit CSI in a SU format after receiving an NDP (as illustrated in FIGS. 11B and 12B).

In some aspects, some of the fields illustrated in each STA information field 1330-1360 may be common to all STAs. Accordingly, in some aspects, the common information field 1325 may additionally or alternatively indicate some of the information illustrated as being a part of each STA information field 1330-1360.

Figure 14:
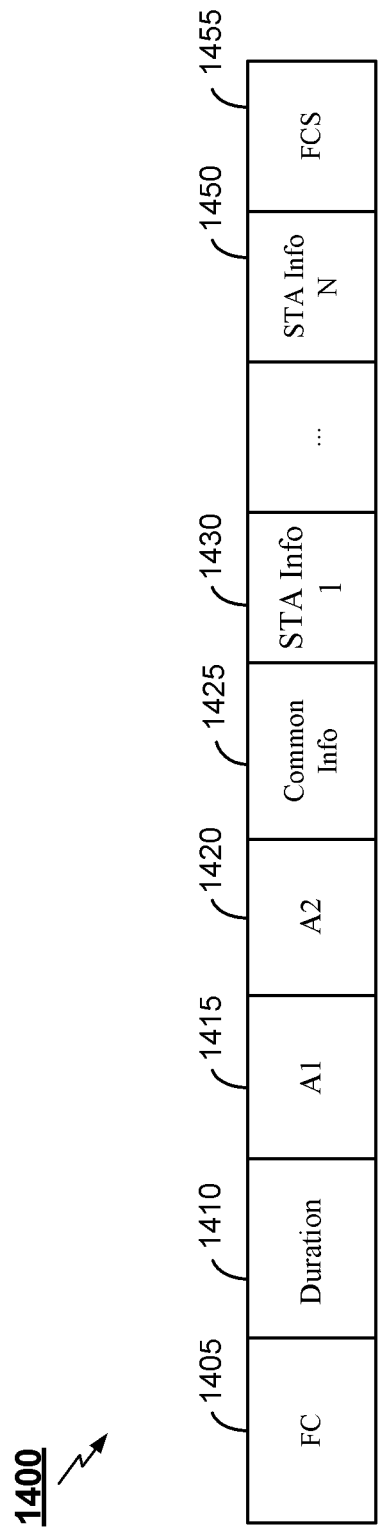
FIG. 14 is a diagram of an exemplary trigger frame format, in accordance with an embodiment.

FIG. 14 is a diagram of an exemplary trigger frame format 1400, in accordance with an embodiment. As illustrated, the trigger frame 1400 may comprise an FC field 1405, a duration field 1410, an RA field 1415 (illustrated as "A1"), a TA field 1420 (illustrated as "A2"), a common information field 1425, station information fields 1430-1450, and an FCS field 1455. In some aspects, the RA field 1415 may be optional, and may not be included. Unless otherwise described, these fields of the trigger frame 1400 may be similar to the corresponding fields of the frame 800 of FIG. 8. In some aspects, the common information field 1425 may comprise transmission or feedback information that is common for all STAs. In some aspects, the station information fields 1430-1450 may comprise transmission or feedback information that is specific to the station (e.g., a station indicated by its AID or MAC address, as discussed herein). For example, one of both of the common information field 1425 or the station information fields 1430-1450 can comprise an indication that only a CSI response is allowed, an eleven or twelve bit AID identifying each STA that needs to respond, an Ng indication (similar to that described above), an indication of whether feedback is to be formatted in accordance with SU or MU beamforming, an indication of whether HE or VHT feedback is to be transmitted, an indication of whether CSI or CQI is to be transmitted, an indication of the portion of the channel the STA should report feedback for, and/or a dialog token to match a dialog token of an NDPA in a sounding sequence for which the feedback is requested. This information may be included in a variety of separate fields, and some of the information may be combined within some of the fields.

Figure 15:
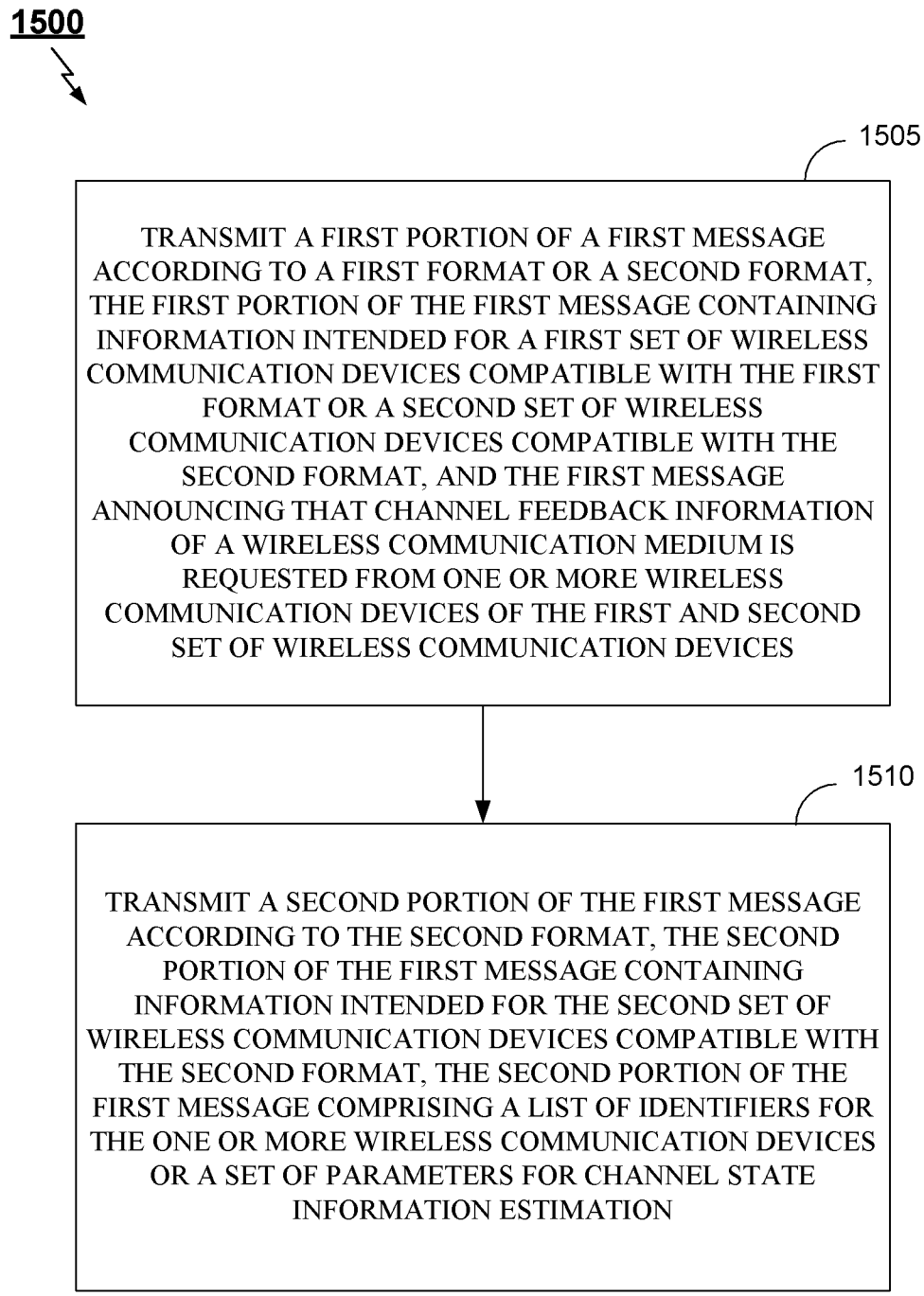
FIG. 15 is a flow chart of an exemplary method for wireless communication in accordance with certain embodiments described herein.

FIG. 15 is a flow chart of an exemplary method 1500 for wireless communication in accordance with certain embodiments described herein. In an aspect, method 1500 may be performed by the AP 110 of FIG. 1 or the wireless communication device 302 of FIG. 3.

At operational block 1505, the wireless communication device 302, for example, may transmit a first portion of a first message according to a first format or a second format, the first portion of the first message containing first information intended for a first set of wireless communication devices compatible with the first format or a second set of wireless communication devices compatible with the second format, and the first message announcing that channel feedback information of a wireless communication medium is requested. In some aspects, the first format comprises a high efficiency (HE) format, and the second format comprises a very-high throughput (VHT) format. In some aspects, first parameters for channel feedback estimation for the first set of wireless communication devices are transmitted after second parameters for channel feedback information estimation for the second set of wireless communication devices. In certain embodiments, identifiers for the first set of wireless communication devices are altered so that the second set of wireless communication devices determines that the identifiers are invalid.

At operational block 1510, the wireless communication device 302, for example, may transmit a second portion of the first message according to the second format, the second portion of the first message containing second information intended for the second set of wireless communication devices compatible with the second format, the second portion of the first message comprising an indication of a number of tones or spatial streams for which the channel feedback information is requested. In some aspects, the first message (e.g., the second portion) may further comprise an indication of whether the channel feedback information is to be transmitted in a single user uplink packet or a multi-user uplink packet, or an indication of whether the channel feedback information comprises channel state information or channel quality information. Additionally or alternatively, in some aspects, the first message (e.g., the second portion) may further comprise an indication of a portion of the wireless communication medium for which channel feedback information is to be calculated, or an indication of a sub-portion of the wireless communication medium for which channel feedback information is to be transmitted.

Additionally or alternatively, as part of method 1500, the wireless communication device 302, for example, may transmit a null-data packet which is useable to determine the channel feedback information. In some aspects, the second portion of the first message further comprises an indication that one or more wireless communication devices are to transmit the channel feedback information immediately. Method 1500 may further comprise receiving the channel feedback information within a short interframe space (SIFS) after transmitting the null-data packet.

In an embodiment, as part of a trigger frame, the wireless communication device 302, for example, may transmit tone or sub-band allocation information for each of one or more wireless communication devices. In an embodiment, the sub-band allocation information may comprise one or more of an indication of an allocation identifier (AID) for each of the one or more wireless communication devices, an indication of whether the channel feedback information is to be transmitted in a single user uplink packet or a multi-user uplink packet, an indication of whether high-efficiency (HE)

or very-high-throughput (VHT) feedback is requested, and a dialog token matching the first message.

In some embodiments, an apparatus performing method 1000, method 1500, or a similar method, comprises various means for generating the messages or frames described herein, and various means for transmitting the messages or frames. In some aspects, the apparatus may further comprise one or more of various means for receiving, means for estimating, or means for allocating. In various embodiments, the various means for generating, means for estimating, or means for allocating may comprise one or more of the controller 230, the TX data processor 210, the data source 208, the data sink 244, the memory 232, the scheduler 234, the channel estimator 228, the TX spatial processor 220, the RX spatial processor 240, or the receiver/transmitter units 222a-ap of FIG. 2, the processor 304, the memory 306, the DSP 320, or the bus system 322 of FIG. 3, or equivalents thereof. In various embodiments, the various means for transmitting may comprise one or more of the controller 230, the data sink 244, the TX data processor 210, the data source 208, the memory 232, the scheduler 234, the TX spatial processor 220, the receiver/transmitter units 222a-ap, or the antennas 224a-ap of FIG. 2, the processor 304, the memory 306, the DSP 320, the bus system 322, the transmitter 310, the transceiver 314, or the antenna 316 of FIG. 3, or equivalents thereof. In various embodiments, the various means for receiving may comprise one or more of the controller 230, the data sink 244, the RX data processor 242, the data source 208, the memory 232, the scheduler 234, the RX spatial processor 240, the receiver/transmitter units 222a-ap, or the antennas 224a-ap of FIG. 2, the processor 304, the memory 306, the DSP 320, the bus system 322, the receiver 312, the transceiver 314, or the antenna 316 of FIG. 3, or equivalents thereof.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

As used herein, a phrase referring to "at least one of" a list of items refers to any combination of those items, including single members. As an example, "at least one of A, B or C" is intended to cover A or B or C or A and B or A and C or B and C or A, B and C or 2A or 2B or 2C and so on.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some aspects, an interface may comprise a receiver configured to receive information or communications from a device at another device. The interface (e.g., of a processor or a bus) may receive information or data processed by a front end or another device or may process information received. In some aspects, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of communication in a wireless network, the method comprising:
   transmitting, from an access point, a first portion of a first message according to a first format or a second format different from the first format, the first portion of the first message containing first information intended for a first set of wireless communication devices capable of processing messages according to the first format or intended for a second set of wireless communication devices capable of processing messages according to the second format, and the first message announcing that channel feedback information of a wireless communication medium is requested from the intended first or second set of wireless communication devices;
   transmitting, from the access point, a second portion of the first message according to the second format, the second portion of the first message containing second information intended for the second set of wireless communication devices, and the second portion of the first message comprising an indication of a number of tones or spatial streams for which the channel feedback information is requested from the second set of wireless communication devices; and
   wherein the first format comprises a high efficiency (HE) format, and wherein the second format comprises a very-high throughput (VHT) format;
   wherein identifiers for the first set of wireless communication devices are altered so that the second set of wireless communication devices determine that the identifiers are invalid.

2. The method of claim 1, wherein the second portion of the first message further comprises one or more of:
   an indication of whether the channel feedback information is to be transmitted in a single user uplink packet or a multi-user uplink packet; and
   an indication of whether the channel feedback information comprises channel state information or channel quality information.

3. The method of claim 1, wherein the second portion of the first message further comprises one or more of:
   an indication of a portion of the wireless communication medium for which the channel feedback information is to be calculated; and
   an indication of a sub-portion of the wireless communication medium for which channel feedback information is to be transmitted.

4. The method of claim 1, further comprising:
   transmitting a null-data packet which is useable to determine the channel feedback information.

5. The method of claim 4, further comprising:
   receiving, at the access point, the channel feedback information within a short interframe space (SIFS) after transmitting the null-data packet, wherein the second portion of the first message further comprises an indication that one or more wireless communication devices are to transmit the channel feedback information immediately.

6. The method of claim 4, further comprising:
   transmitting, as part of a trigger frame, tone or sub-band allocation information for each of one or more wireless communication devices.

7. The method of claim 6, wherein the tone or sub-band allocation information comprises one or more of:
   an indication of an allocation identifier (AID) for each of the one or more wireless communication devices;
   an indication of whether the channel feedback information is to be transmitted in a single user uplink packet or a multi-user uplink packet;
   an indication of whether high-efficiency (HE) or very-high-throughput (VHT) feedback is requested; and
   a dialog token matching the first message.

8. The method of claim 1, wherein first parameters for channel feedback estimation for the first set of wireless communication devices compatible with the first format are transmitted after second parameters for channel feedback estimation for the second set of wireless communication devices compatible with the second format.

9. An apparatus for communication in a wireless network, the apparatus comprising:
   a processor configured to:
      generate a first portion of a first message according to a first format or a second format different from the first format, the first portion of the first message containing first information intended for a first set of wireless communication devices capable of processing messages according to the first format or intended for a second set of wireless communication devices capable of processing messages according to the second format, and the first message announcing that channel feedback information of a wireless communication medium is requested from the intended first or second set of wireless communication devices, and generate a second portion of the first message according to the second format, the second portion of the first message containing second information intended for the second set of wireless communication devices, and the second portion of the first message comprising an indication of a number of tones or spatial streams for which the channel feedback information is requested from the second set of wireless communication devices;

a transmitter configured to transmit the first message; and wherein the first format comprises a high efficiency (HE) format, and wherein the second format comprises a very-high throughput (VHT) format;

wherein identifiers for the first set of wireless communication devices are altered so that the second set of wireless communication devices determine that the identifiers are invalid.

10. The apparatus of claim 9, wherein the second portion of the first message further comprises one or more of:
an indication of whether the channel feedback information is to be transmitted in a single user uplink packet or a multi-user uplink packet; and
an indication of whether the channel feedback information comprises channel state information or channel quality information.

11. The apparatus of claim 9, wherein the second portion of the first message further comprises one or more of:
an indication of a portion of the wireless communication medium for which the channel feedback information is to be calculated; and
an indication of a sub-portion of the wireless communication medium for which channel feedback information is to be transmitted.

12. The apparatus of claim 9, wherein the transmitter is further configured to transmit a null-data packet which is useable to determine the channel feedback information.

13. The apparatus of claim 12, further comprising:
a receiver configured to receive the channel feedback information within a short interframe space (SIFS) after transmitting the null-data packet, wherein the second portion of the first message further comprises an indication that one or more wireless communication devices are to transmit the channel feedback information immediately.

14. The apparatus of claim 12, wherein the transmitter is further configured to transmit, as part of a trigger frame, tone or sub-band allocation information for each of one or more wireless communication devices.

15. The apparatus of claim 14, wherein the tone or sub-band allocation information comprises one or more of:
an indication of an allocation identifier (AID) for each of the one or more wireless communication devices;
an indication of whether the channel feedback information is to be transmitted in a single user uplink packet or a multi-user uplink packet;
an indication of whether high-efficiency (HE) or very-high-throughput (VHT) feedback is requested; and
a dialog token matching the first message.

16. The apparatus of claim 9, wherein first parameters for channel state information estimation for the first set of wireless communication devices compatible with the first format are transmitted after second parameters for channel state information estimation for the second set of wireless communication devices compatible with the second format.

17. An apparatus for communication in a wireless network, the apparatus comprising:
means for generating a first portion of a first message according to a first format or a second format different from the first format, the first portion of the first message containing first information intended for a first set of wireless communication devices capable of processing messages according to the first format or intended for a second set of wireless communication devices capable of processing messages according to the second format, and the first message announcing that channel feedback information of a wireless communication medium is requested from the intended first or second set of wireless communication devices;

means for generating a second portion of the first message according to the second format, the second portion of the first message containing second information intended for the second set of wireless communication devices, and the second portion of the first message comprising an indication of a number of tones or spatial streams for which the channel feedback information is requested from the second set of wireless communication devices;

means for transmitting the first message; and wherein the first format comprises a high efficiency (HE) format, and wherein the second format comprises a very-high throughput (VHT) format;

wherein identifiers for the first set of wireless communication devices are altered so that the second set of wireless communication devices determine that the identifiers are invalid.

18. The apparatus of claim 17, wherein the second portion of the first message further comprises one or more of:
an indication of whether the channel feedback information is to be transmitted in a single user uplink packet or a multi-user uplink packet; and
an indication of whether the channel feedback information comprises channel state information or channel quality information.

19. The apparatus of claim 17, wherein the second portion of the first message further comprises one or more of:
an indication of a portion of the wireless communication medium for which the channel feedback information is to be calculated; and
an indication of a sub-portion of the wireless communication medium for which channel feedback information is to be transmitted.

20. The apparatus of claim 17, further comprising:
means for transmitting a null-data packet which is useable to determine the channel feedback information.

21. The apparatus of claim 20, further comprising:
means for receiving the channel feedback information within a short interframe space (SIFS) after transmitting the null-data packet, wherein the second portion of the first message further comprises an indication that one or more wireless communication devices are to transmit the channel feedback information immediately.

22. A non-transitory computer readable medium having stored thereon, instructions that, when executed, cause a processor of an apparatus to:
generate a first portion of a first message according to a first format or a second format different from the first format, the first portion of the first message containing first information intended for a first set of wireless communication devices capable of processing messages according to the first format or intended for a second set of wireless communication devices capable of processing messages according to the second format, and the first message announcing that channel feedback information of a wireless communication medium is requested from the intended first or second set of wireless communication devices;

generate a second portion of the first message according to the second format, the second portion of the first message containing second information intended for the second set of wireless communication devices, and the second portion of the first message comprising an indication of a number of tones or spatial streams for which the channel feedback information is requested from the second set of wireless communication devices;

transmit the first message; and wherein the first format comprises a high efficiency (HE) format, and wherein the second format comprises a very-high throughput (VHT) format;

wherein identifiers for the first set of wireless communication devices are altered so that the second set of wireless communication devices determine that the identifiers are invalid.

23. The non-transitory computer readable medium of claim 22, wherein the second portion of the first message further comprises one or more of:

an indication of whether the channel feedback information is to be transmitted in a single user uplink packet or a multi-user uplink packet; and an indication of whether the channel feedback information comprises channel state information or channel quality information.

24. The non-transitory computer readable medium of claim 22, wherein the second portion of the first message further comprises one or more of:

an indication of a portion of the wireless communication medium for which the channel feedback information is to be calculated; and an indication of a sub-portion of the wireless communication medium for which channel feedback information is to be transmitted.

25. The non-transitory computer readable medium of claim 22, wherein the instructions, when executed, further cause the processor of the apparatus to:

transmit a null-data packet which is useable to determine the channel feedback information.

26. The non-transitory computer readable medium of claim 25, wherein the instructions, when executed, further cause the processor of the apparatus to:

receive the channel feedback information within a short interframe space (SIFS) after transmitting the null-data packet, wherein the second portion of the first message further comprises an indication that one or more wireless communication devices are to transmit the channel feedback information immediately.

* * * * *